United States Patent [19]

Yoshinaga et al.

[11] Patent Number: 5,272,552
[45] Date of Patent: Dec. 21, 1993

[54] OPTICAL MODULATION DEVICE AND METHOD USING MODULATION LAYER OF HELICAL POLYMER LIQUID CRYSTAL HAVING A HELICAL CHIRAL SMECTIC C PHASE

[75] Inventors: Kazuo Yoshinaga, Machida; Yutaka Kurabayashi, Yokohama; Kazuo Isaka, Tokyo; Shuzo Kaneko, Yokohama; Akihiro Mouri, Atsugi; Yomishi Toshida, Yokohama; Toshikazu Ohnishi; Takeo Eguchi, both of Atsugi, all of Japan

[73] Assignee: Canon Kabushiki Kaisha, Tokyo, Japan

[21] Appl. No.: 347,920

[22] Filed: May 5, 1989

[30] Foreign Application Priority Data

May 11, 1988 [JP] Japan ................ 63-115774
Jun. 2, 1988 [JP] Japan ................ 63-134422

[51] Int. Cl.⁵ .......................................... G02F 1/13
[52] U.S. Cl. .................... 359/43; 359/100; 359/104; 365/108
[58] Field of Search ........ 350/350 S; 359/100, 359/104, 43, 44; 252/299.01; 365/108

[56] References Cited

U.S. PATENT DOCUMENTS

| | | | |
|---|---|---|---|
| 4,293,435 | 10/1981 | Portugall et al. | 252/299.01 |
| 4,702,558 | 10/1987 | Coles et al. | 252/299.01 |
| 4,844,835 | 7/1989 | Uchida et al. | 252/299.01 |
| 4,852,978 | 8/1989 | Davey et al. | 359/100 |
| 4,902,107 | 2/1990 | Tsuboyama et al. | 350/350 X |
| 4,904,057 | 2/1990 | Sakayori et al. | 350/350 S |
| 4,904,065 | 2/1990 | Yuasa et al. | 350/350 S |
| 4,995,705 | 2/1991 | Yoshinaga et al. | 359/44 |
| 5,066,107 | 11/1991 | Yoshinaga et al. | 359/43 |
| 5,103,332 | 4/1992 | Kaneko et al. | 359/43 |

FOREIGN PATENT DOCUMENTS 0228703 7/1987 European Pat. Off. .
0232113 8/1987 European Pat. Off. .

OTHER PUBLICATIONS

Nakamura, #62-107448, May 18, 1987, Patent Abstracts of Japan, vol. 11, No. 319 (P-627)[2766].
Platé et al, Polymer Journal, vol. 19, No. 1 (1987) 135:45.
Bualek et al, Molecular Crystals and Liquid Crystals, vol. 155 (1988) 47:56.
Yoshino et al, Japanese Journal of Applied Physics, vol. 17, No. 3 (1978) 597:98.
Plate et al. "Macromol. Chem. Suppl." vol. 6, pp. 3-26 (1984).

*Primary Examiner*—Edward Wojciechowicz
*Assistant Examiner*—Courtney A. Bowers
*Attorney, Agent, or Firm*—Fitzpatrick, Cella, Harper & Scinto

[57] ABSTRACT

An optical modulation device is provided by forming an optical modulation layer comprising a polymer liquid crystal having a helical structure and a non-helical structure in chiral smectic C phase. The helical structure of the polymer liquid crystal is selectively formed or removed to provide a recorded state. The recorded state is held below the glass transition point of the polymer liquid crystal. The helical pitch of the helical structure can be selectively changed to form a recorded state. The helical structure can be formed to dispose its principal axis perpendicularly to the polymer liquid crystal layer. The recorded state may be read out by detecting a reflectance from the polymer liquid crystal layer.

3 Claims, 6 Drawing Sheets

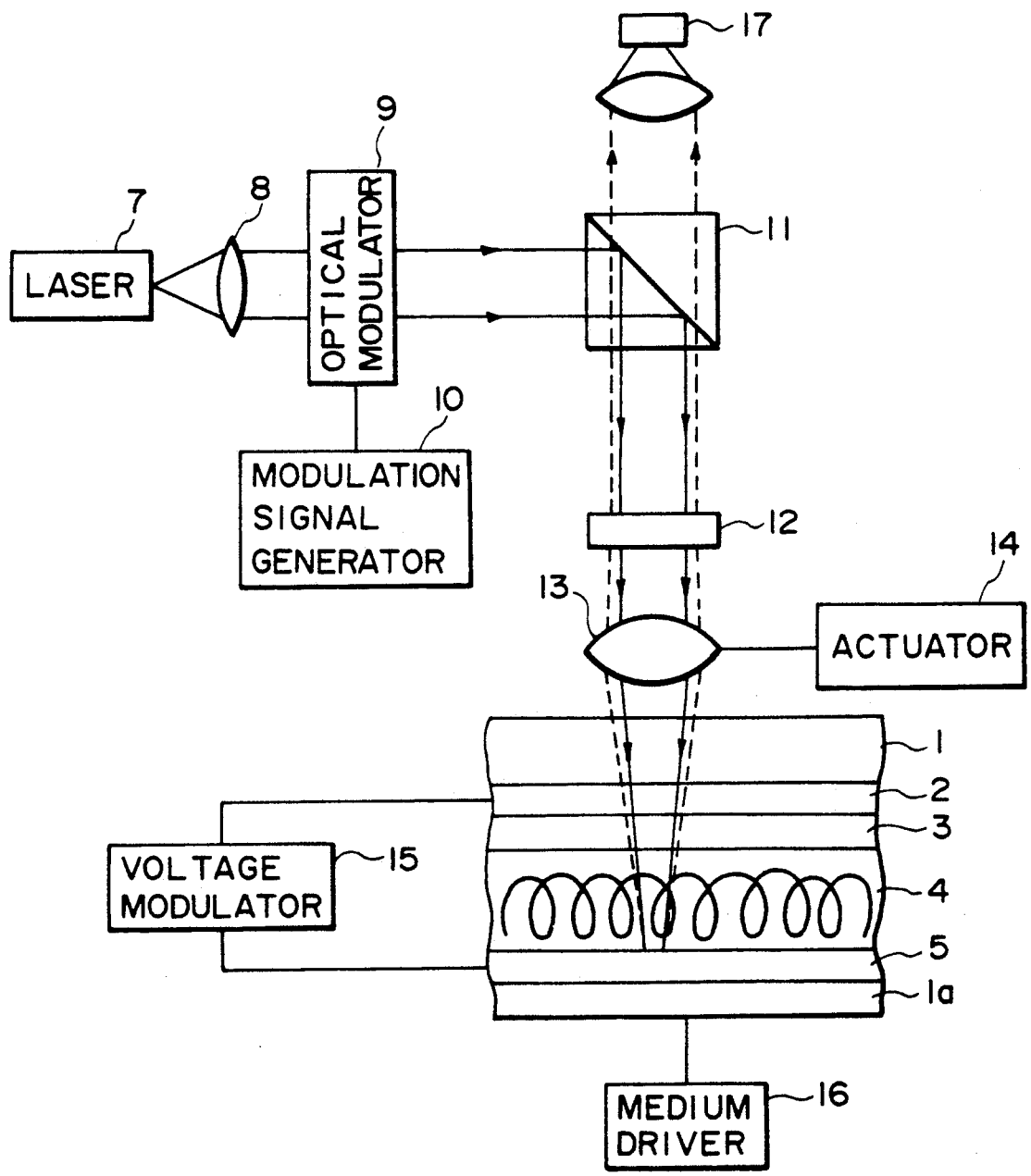
F I G. 1

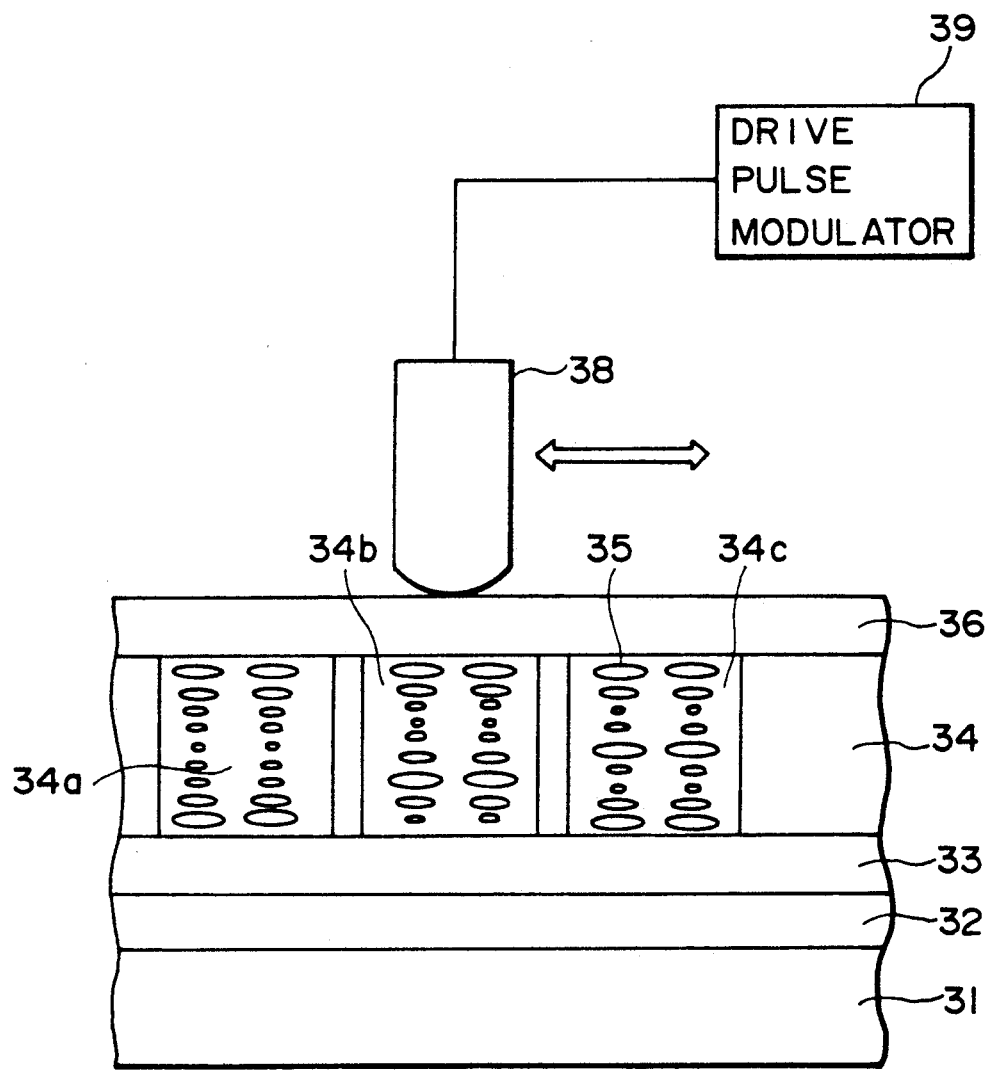
F I G. 6

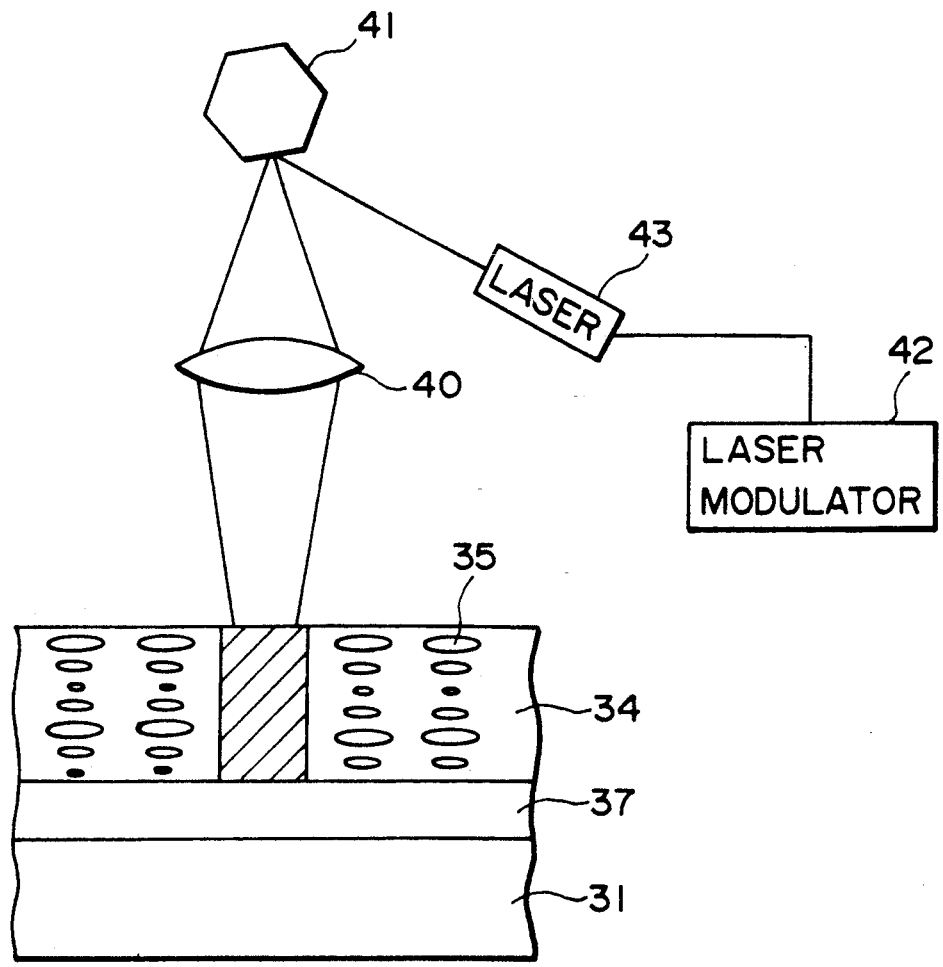
F I G. 7

OPTICAL MODULATION DEVICE AND METHOD USING MODULATION LAYER OF HELICAL POLYMER LIQUID CRYSTAL HAVING A HELICAL CHIRAL SMECTIC C PHASE

FIELD OF THE INVENTION AND RELATED ART

The present invention relates to a rewritable optical modulation device using a polymer liquid crystal, and an optical modulation method using such a device. Particularly, the present invention relates to a device and a method using an optical modulation layer which comprises a polymer liquid crystal having a helical structure.

At present, use of an optical memory system has been desired because of its large capacity and random access characteristic. Various systems exclusively for reproduction have been known include a digital audio disc (CD) and a laser video disc (LD). Device capable of optical recording may include a rewritable optical disc (WO) and an optical card (OC) wherein, phase change of a metal film is utilized or pits are formed in an organic dye layer.

Further studies of rewritable optical discs have been made so as to utilize an opto-magnetic effect, or a phase change, etc. For example a polymer liquid crystal has been proposed as an information recording medium (Japanese Patent Laid-Open Applications Nos. 10930/1984, 35989/1984, 154340/1987, etc.) and there have been proposed recording systems wherein the helical pitch length of a cholesteric polymer liquid crystal is changed or pits are formed in a non alignment state to change the optical reflectance at multi-values (Japanese Patent Laid-Open Applications Nos. 107448/1987 and 12937/1987). Further, there have been proposed display apparatus using polymer liquid crystals (Japanese Laid-Open Patent Applications Nos. 278529/1987 and 278530/1987).

However, such rewritable information recording media or display apparatus involve various defects. A phase change medium and an opto-magnetic recording medium are deleterious in terms of production cost, production time and production apparatus because techniques, such as vapor deposition or sputtering, are required for film formation. Further, opto-magnetic recording medium utilize, inversion of spin, and the rotation of a polarizing plane (due to the Kerr or Faraday effect accompanying the inversion is detected to read out a recorded state. Since rotation angle is as little as 1 degree (or even less), the optical system and electrical system is necessarily complicated.

On the other hand, data recording media or display apparatus using a polymer liquid crystal in an optical modulation layer are being proposed as media or apparatus of the future sure they can be produced at a low cost and provide excellent recording contrast. However, media, method and apparatus using polymer liquid crystals involve slow writing and erasure speeds and are not suitable for high speed recording and overwriting.

Low-molecular weight ferroelectric liquid crystals (hereinafter called FLC) are known to form a helical structure when they are sealed in a cell having a thickness on the order of several tens of microns and an provided with a homogeneous aligning treatment. Such a helical structure is formed because in each layer of a smectic phase, the orientation direction of a molecule gradually deviates around a cone formed by the inclination angle of the smectic phase layer with respect to the normal (FIG. 2A). When an electric field is applied to such an FLC layer, the dipole moments of respective molecules reoriented in the direction of the electric field so that the helical structure is unwound (FIG. 2B).

It has been proposed to realize a display device by utilizing the change in transmitted light quantity which is caused by such a change in molecular alignment (K. Yoshince, K. G. Balakrishnan, T. Uemoto, Y. Iwasaki and Y. Inuishi, Jpn. J. Appl. Phys. 17. 597 (1978)). In such a display device, when an electric field is applied between the electrodes, a change of FLC alignment from its helical structure to its non-helical structure can be caused at a high response speed of several hundreds of microseconds.

However, such a change in helical structure of FLC due to electric field is effectively caused only under application of the electric field, and the helical structure is restored immediately when the electric field is removed. The device is therefore complicated for use in data recording media or in a display apparatus. Further, since the portion of electric field application is determined by an electrode area, it is difficult to provide a high data density There have also been no display apparatus using a polymer liquid crystal which are of causing effective scattering, i.e., capable providing a display of a high contrast.

SUMMARY OF THE INVENTION

Accordingly, a principal object of the present invention is to provide an optical modulation device using a polymer liquid crystal which can be produced at a low cost and yet provides large images a high degree of detail, high contrast and fast recording and erasure speeds.

A further object of the present invention is to provide a method and an apparatus using such a optical modulation device.

A still further object of the present invention is to provide an optical modulation device and method using a polymer liquid crystal, wherein high efficiency selective scattering is used to provide a display with good contrast and color purity.

According to an aspect of the present invention, there is provided an optical modulation method which comprises: providing a recording medium having a layer of a polymer liquid crystal having a chiral smectic C phase, and selecting as a recorded state a helical structure or non-helical structure of the layer in chiral smectic C phase.

According to another aspect of the present invention, there is provided an optical modulation apparatus comprising: a recording layer of a polymer liquid crystal having a helical structure in its chiral smectic C phase, recording means for forming a helical structure in the chiral smectic C phase through temperature control and reproduction means for detecting a reflected light quantity from the recording layer in response to incident light.

According to a further aspect of the present invention, there is provided an optical modulation method which comprises: providing a display medium having a display layer of a polymer liquid crystal having a helical structure and providing a display by orienting the principal axis of the helical structure perpendicularly to the display layer.

These and other objects, features and advantages of the present invention are explained in the following description of the preferred embodiments in conjunction with the accompanying drawings.

BRIEF DESCRIPTION OF THE DRAWINGS

FIG. 1 shows an embodiment of the optical modulation apparatus according to the present invention.

FIGS. 6 and 7 illustrate display media and an optical modulation methods using media according to the prevent invention.

DETAILED DESCRIPTION OF THE PREFERRED EMBODIMENTS

Figure 2:
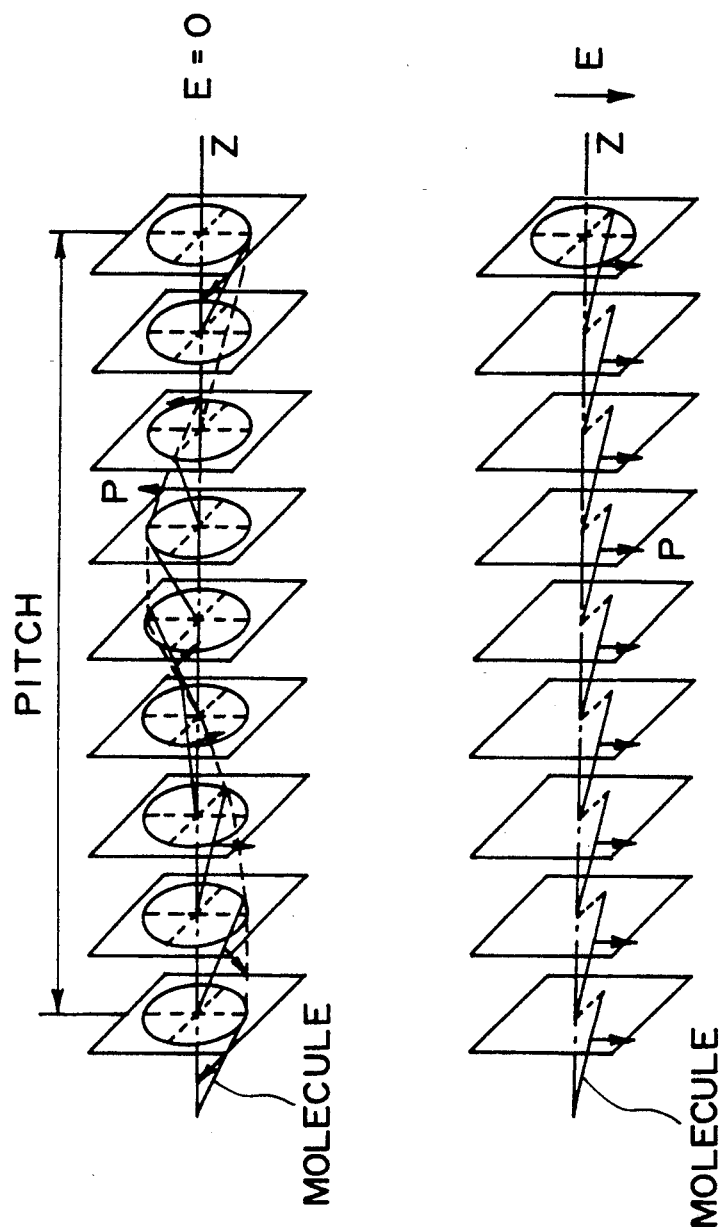
FIGS. 2A and 2B are schematic illustrations of a helical structure and a non-helical structure in chiral smectic C phase.

In the present invention, there is used a recording medium having an optical modulation layer comprising a layer of a polymer liquid crystal having a helical structure in its chiral smectic C phase. A recording state is attained by controlling the helical structure to select a helical pitch, a helical rotation direction or a non-helical structure. Thus, a data recording or display medium can be produced at a low cost by using a simple method such as spin coating. Further, the selection of a helical structure or non-helical structure can be effected at a high speed, and the written state is both stably retained and reproduced at a high contrast.

The helical structure of a polymer liquid crystal having chiral smectic C phase occurs as a result of twisting of a mesogen unit of the polymer liquid crystal in each smectic layer. Since, the respective mesogen units are linked by a covalent bond, the helical structure is also further stabilized. Scattering of light is caused depending on a periodical repetition (helical pitch) of the helical structure so that different colors such as red or orange can be observed depending on the change in helical pitch. For this reason, it is desirable to control the helical pitch depending on the wavelength of light for writing or readout.

The helical pitch changes depending on the chemical structure of a polymer liquid crystal and can be set within a desired arbitrary range. Further, the helical pitch changes depending on a temperature through temperature control within the chiral smectic C phase and can be fixed by rapid by cooling the liquid crystal to a temperature below its glass transition point.

The helical structure can be made dextro-rotational or levo-rotational by controlling chemical structure, temperature, etc. When the polymer liquid crystal in a helical structure is irradiated with circularly polarized light, only the portion of the circularly polarized light rotating in the same direction is reflected. Therefore, a polymer liquid crystal which changes the rotation direction of the helical structure from dextro-rotation to levo-rotation according to a temperature change provides a high contrast when it is rapidly cooled below glass transition point to fix the rotation direction.

When the glass transition point is substantially higher than room temperature, a recorded state or non-recorded state can be obtained by selecting either a helical structure of chiral smectic C phase or a non-helical structure given by glass state of an isotropic phase, or a non-helical structure of another liquid crystal phase such as smectic A phase or of chiral smectic C phase.

For this purpose, the polymer liquid crystal may be heated into a selected phase by heating means and then rapidly cooled. Alternatively, polymer liquid crystal may be once heated, slowly cooled to a liquid crystal phase, and then rapidly cooled to fix information. At this time, it is also possible to change the molecular alignment by application of an electric field or magnetic field. An electric field is particularly suited for obtaining a non-helical structure of chiral smectic C phase.

The polymer liquid crystal may preferably have from 5 to 1000 recurring units therein. Examples of the polymer liquid crystal used in the present invention include those represented by the following formulas (1)–(60).

In the formulae (1)–(13) below, $1 \leq n < 15$, and $p-5-1000$.

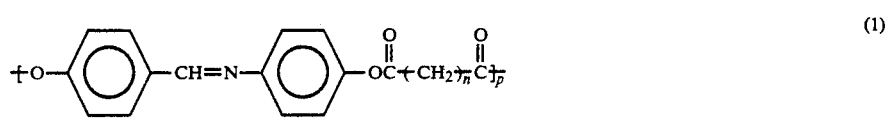

(1)

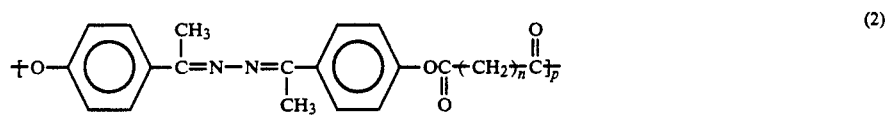

(2)

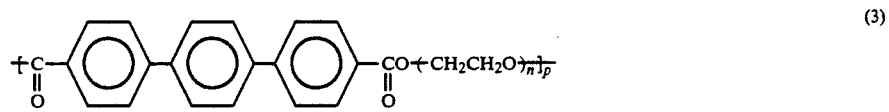

(3)

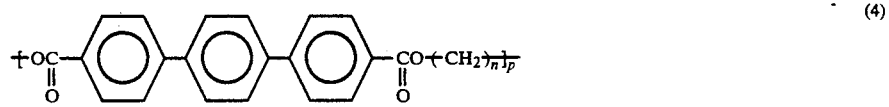

(4)

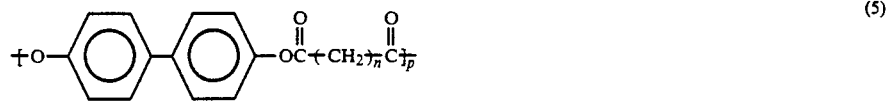

(5)

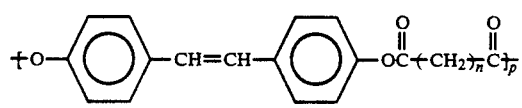
(6)
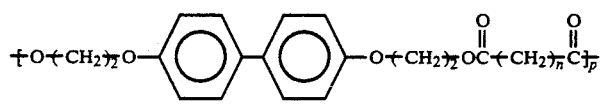
(7)
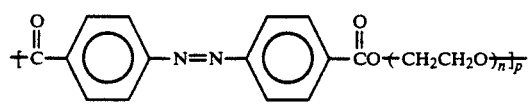
(8)
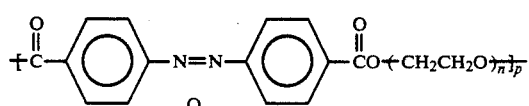
(9)
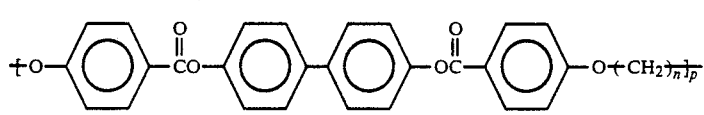
(10)
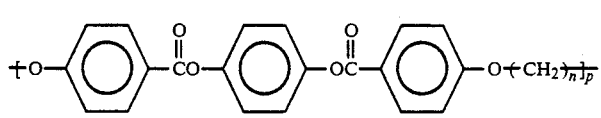
(11)
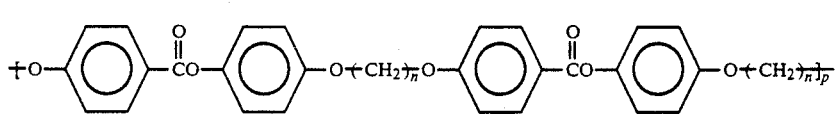
(12)
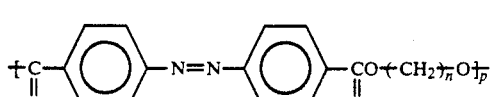
(13)
In the formulae (14)–(60) below, p=5–1000, p1+p2=5–1000, q=1–16, q1=1–16 and q2=1–16.
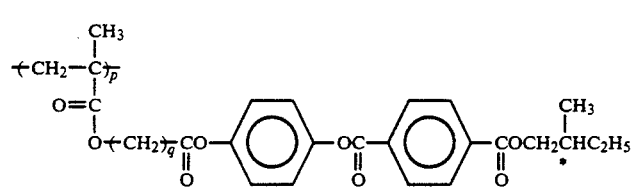
(14)
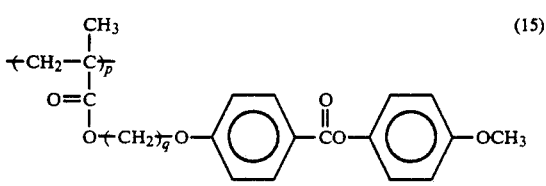
(15)
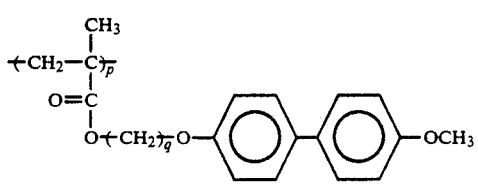
(16)

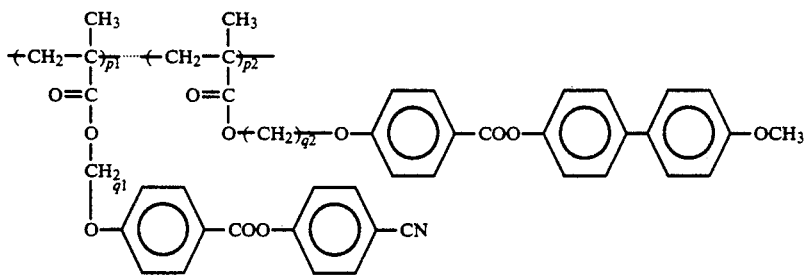
(17)
In the formulae (18)–(46) below, * denotes the location of an asymmetric carbonatom and n=5–1000.
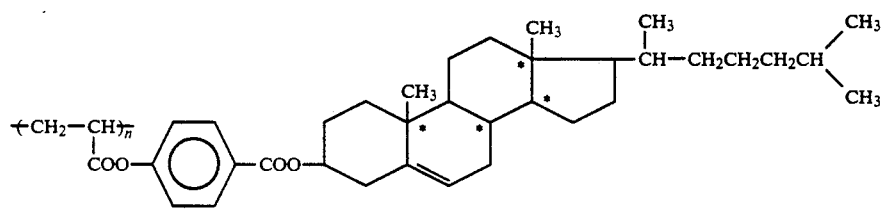
(18)
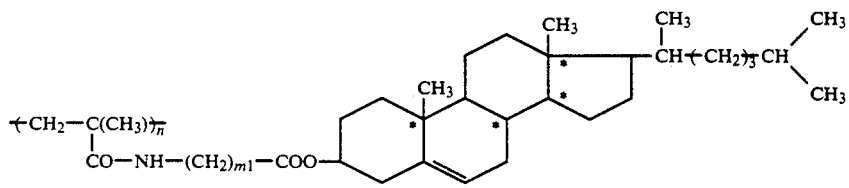
(19)
(m1 = 2–10)
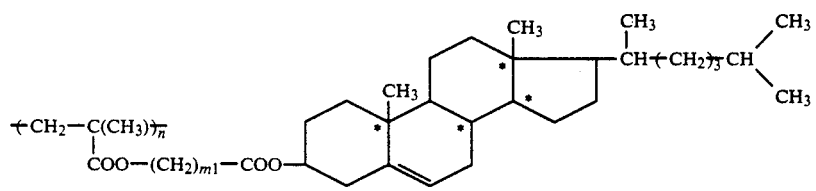
(20)
(m1 = 2–10)
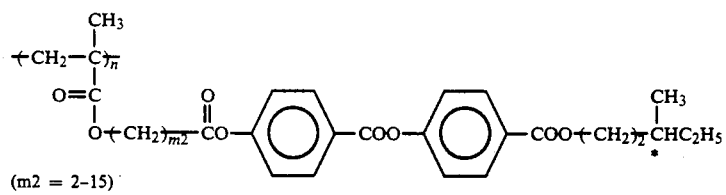
(21)
(m2 = 2–15)
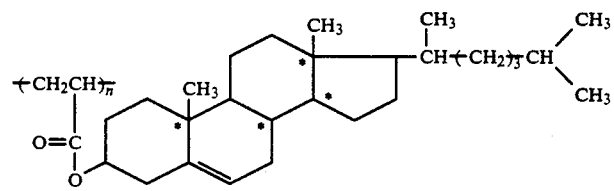
(22)
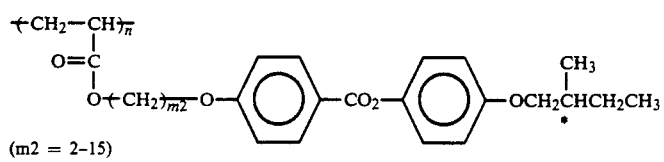
(23)
(m2 = 2–15)

-continued
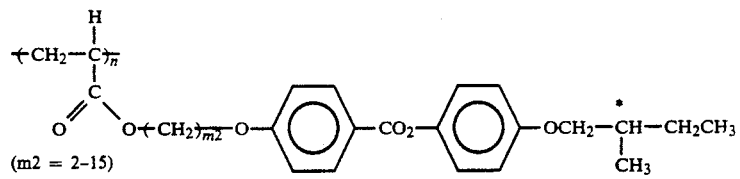
(24)
(m2 = 2-15)
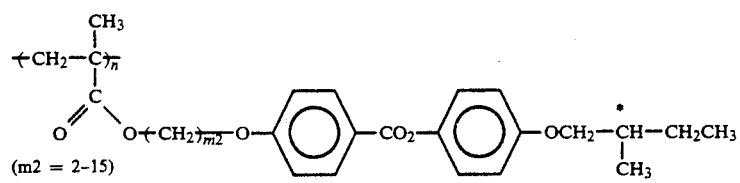
(25)
(m2 = 2-15)
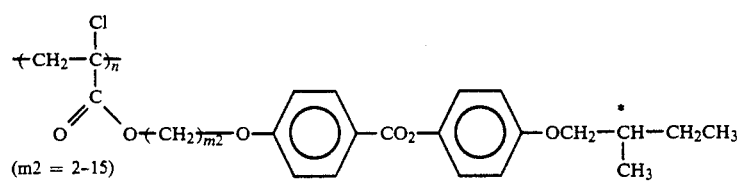
(26)
(m2 = 2-15)
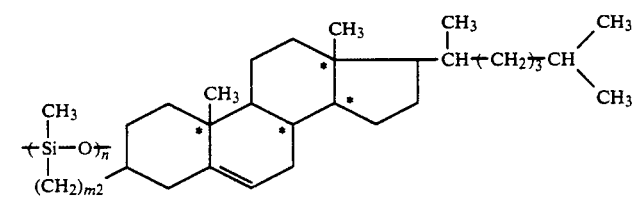
(27)
(m2 = 2-15)
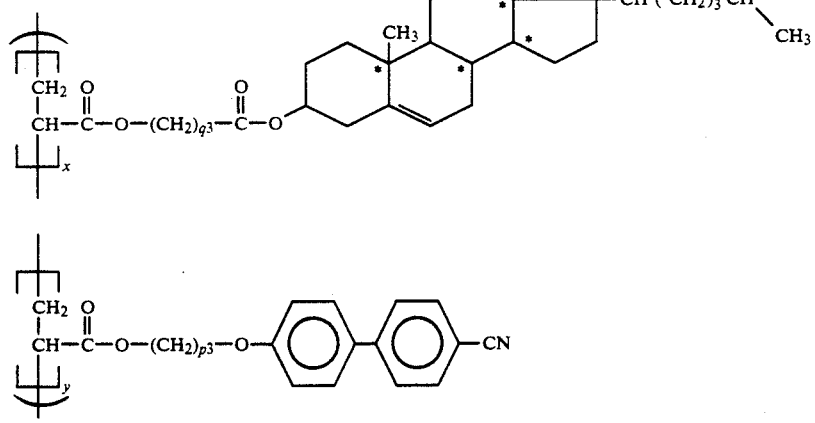
(28)
(x + y = 1, q3 = 1-10, p3 = 1-10)
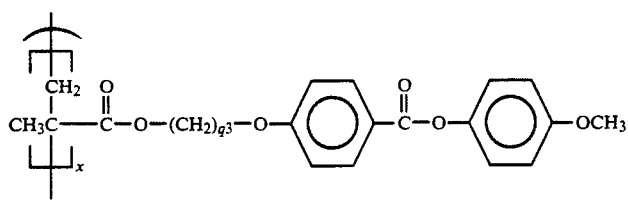
(29)

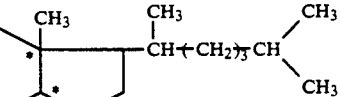
-continued
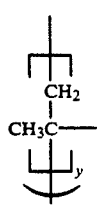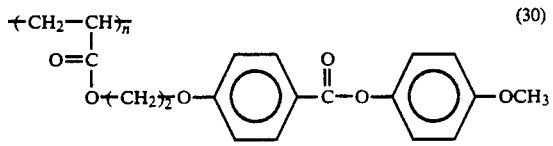
(x + y = 1, q3 = 1-10, p4 = 1-15)
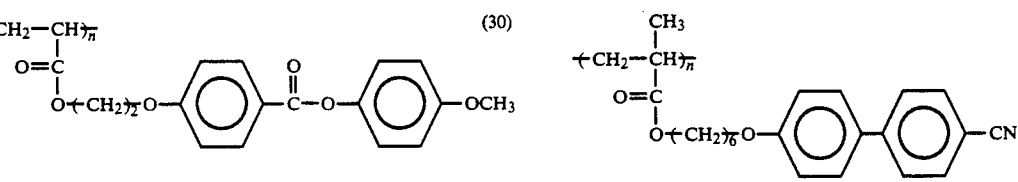
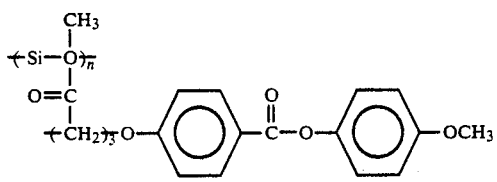
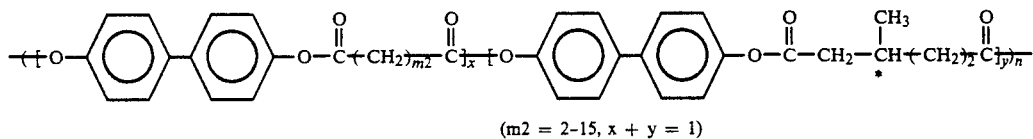
(m2 = 2-15, x + y = 1)
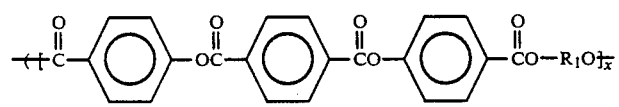
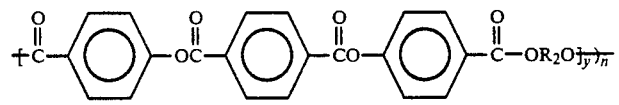
$R_1 = -CH_2CH_2\overset{*}{\underset{CH_3}{CH}}(CH_2)_3$   $R_2 = (CH_2)_{m2}$
(x + y = 1, m2 = 2-15)
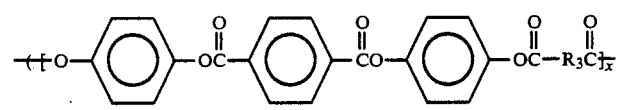
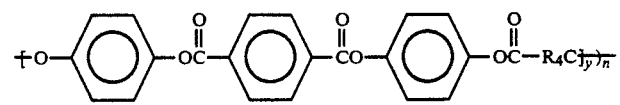
$R_3 = -CH_2\overset{*}{\underset{CH_3}{CH}}(CH_2)_2$   $R_4 = (CH_2)_{m2}$
(x + y = 1, m2 = 2-15)
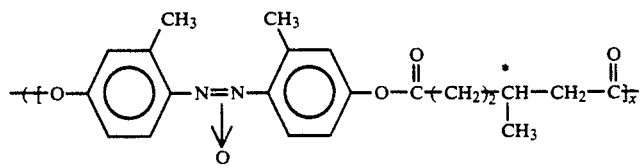

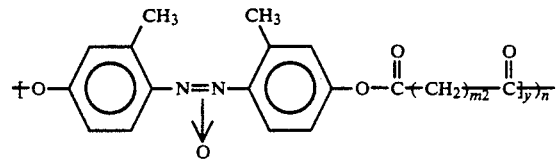
(x + y = 1, m2 = 2-15)
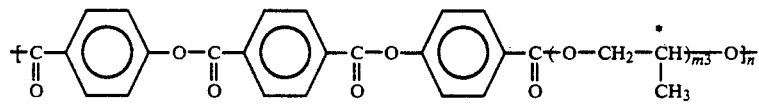     (37)
(m3 = 1-5)
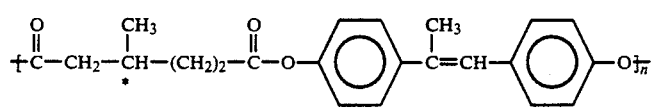     (38)
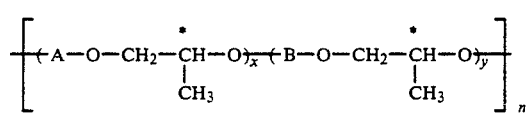     (39)
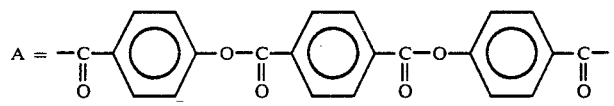
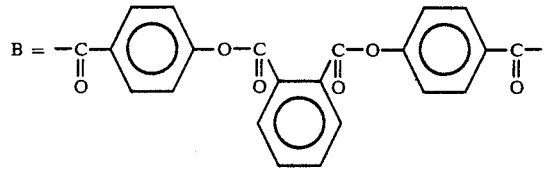
(x + y = 1)
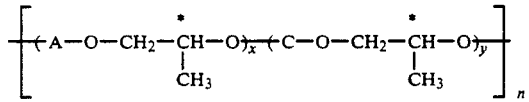     (40)
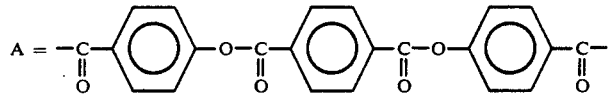
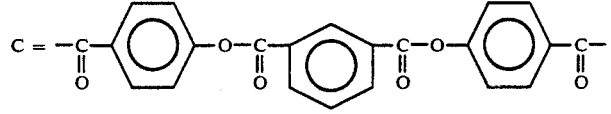
(x + y = 1)
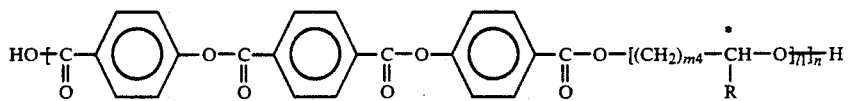     (41)
(m4 = 1-3, l1 = 1-20)

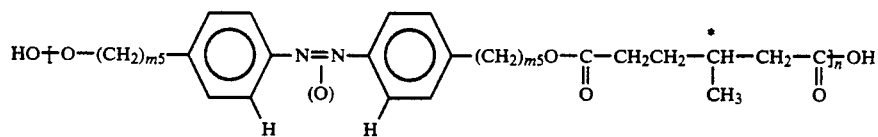 (42)
(m5 = 0-5)
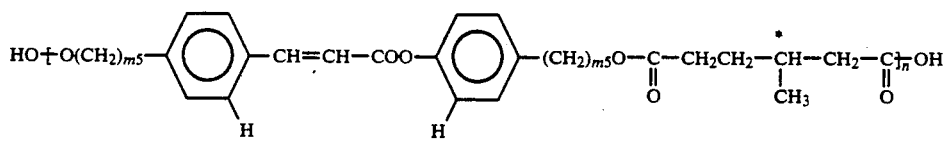 (43)
(m5 = 0-5)
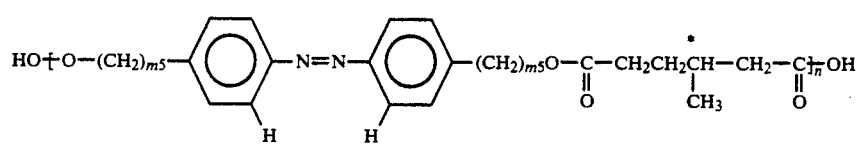 (44)
(m5 = 0-5)
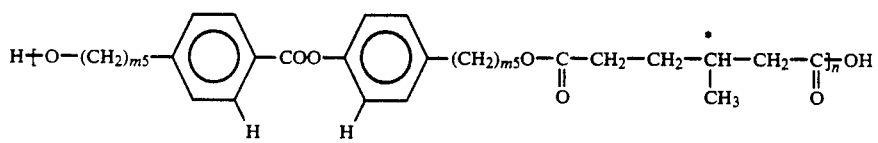 (45)
(m5 = 0-5)
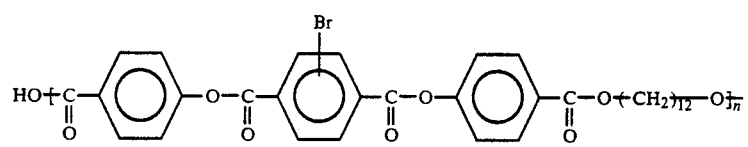 (46)
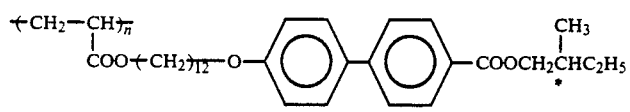 (47)
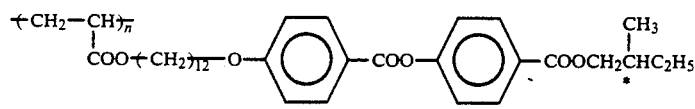 (48)
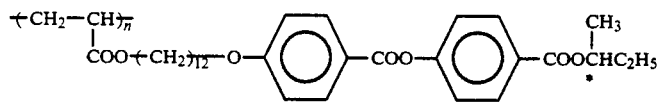 (49)
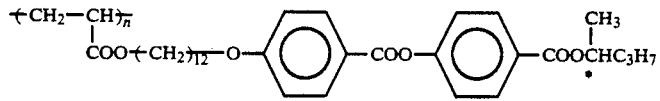 (50)
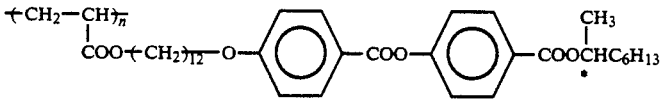 (51)
In the formulas (52)–(60), m6=1–18, and n=5–1000.

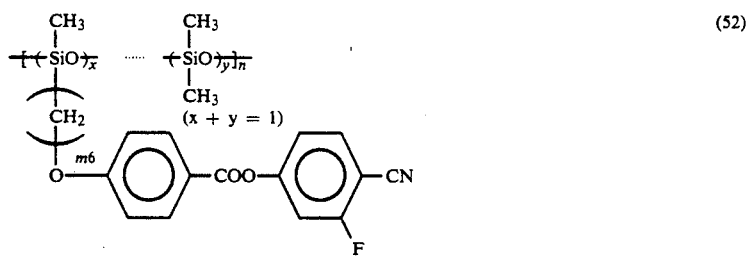
(52)
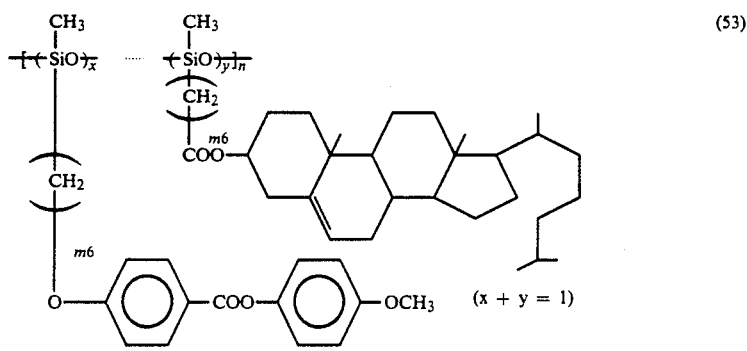
(53)
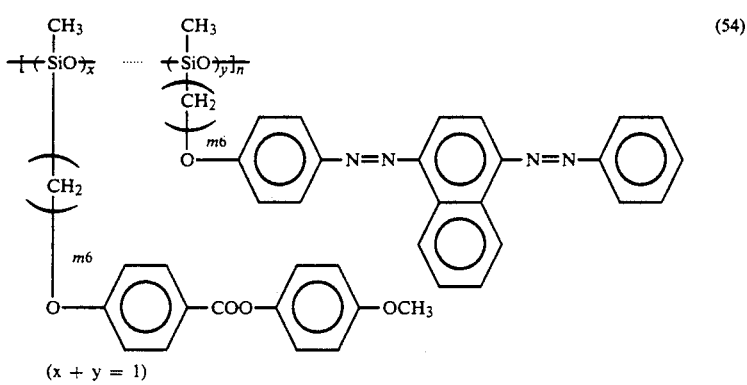
(54)
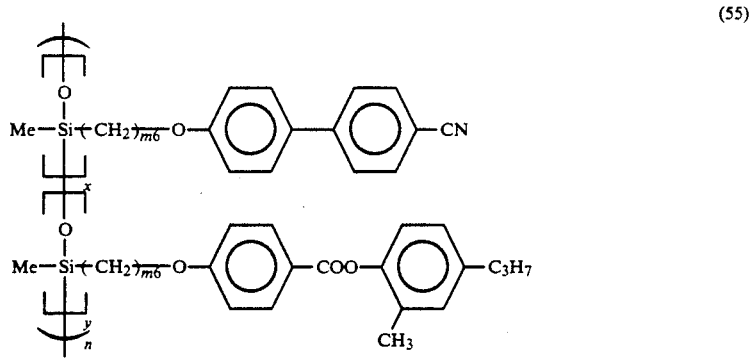
(55)
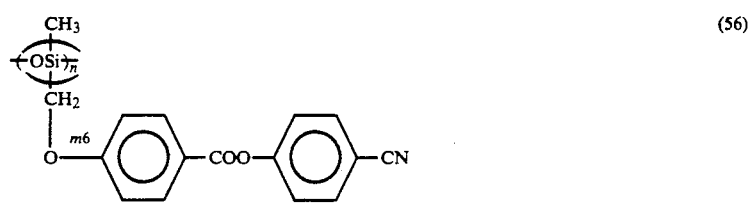
(56)

-continued

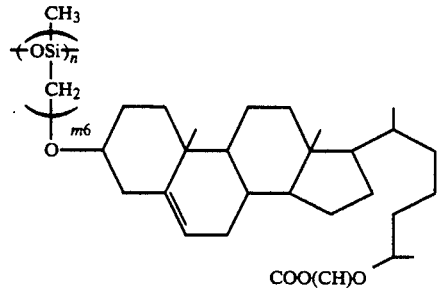 (57)

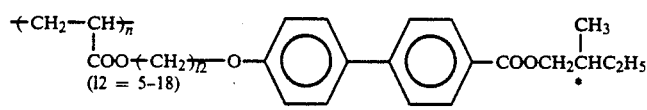 (58)

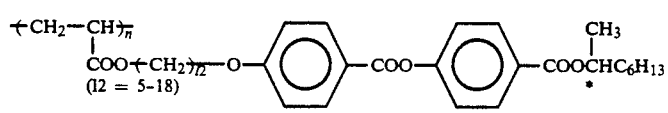 (59)

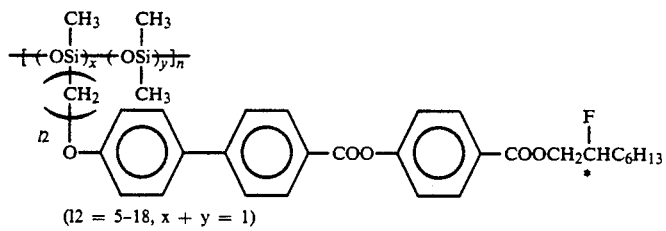 (60)

For the a polymer liquid crystals described above, it is important to have a flexible polymer chain in order to form a good helical structure in chiral smectic C phase. Such a flexible chain may be alkyl chain, an alkylene chain, a poly(alkyloxy) chain, an acryl chain or a methacryl chain, and may preferably have a large degree of freedom and flexibility. A particularly preferred class of polymer liquid crystals are those having a poly(dimethylsiloxane) unit as a flexible chain.

A polymer liquid crystal may have an optically active group which may for example be 2-methylbutyl group, 1-methylpropyl group, 1-methyl-heptyl group or cholesterol group. A polymer liquid crystal having a structure of a large steric hindrance is liable to provide a small helical pitch.

In case where a polymer liquid crystal per se has no optically active group, it is necessary to mix the polymer liquid crystal with a compound having an optically active group, which may preferably be a low-molecular weight ferroelectric liquid crystal. Examples of the low-molecular weight ferroelectric liquid crystal may include those represented by the following formulae (1)–(15) together with there respective phase transition characteristics (wherein the symbols used denote the following phases).

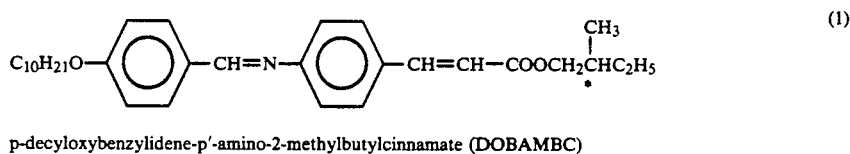 (1)

p-decyloxybenzylidene-p'-amino-2-methylbutylcinnamate (DOBAMBC)

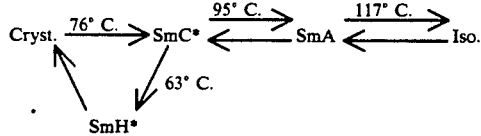

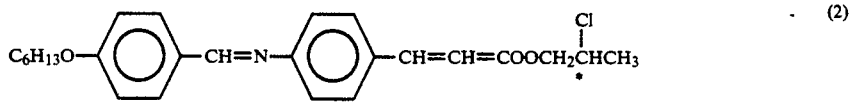 (2)

p-hexyloxybenzylidene-p'-amino-2-chloropropylcinnamate (HOBACPC)

-continued

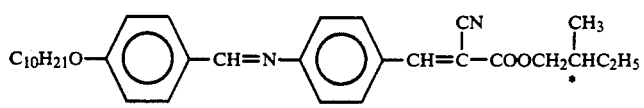
(3)

p-decyloxybenzylidene-p'-amino-2-methylbutyl-α-cyanocinnamate (DOBAMBCC)

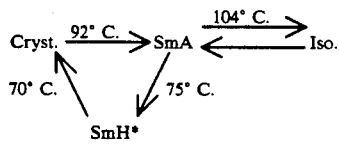

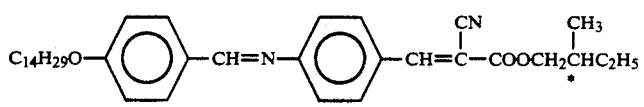
(4)

p-tetradecyloxybenzylidene-p'-amino-2-methylbutyl-α-cyanocinnamate (TDOBAMBCC)

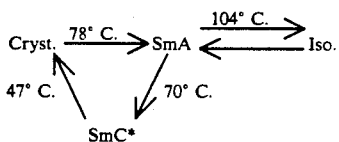

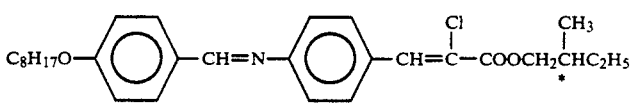
(5)

p-octyloxybenzylidene-p'-amino-2-methylbutyl-α-chlorocinnamate (OOBAMBCC)

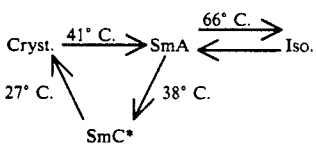

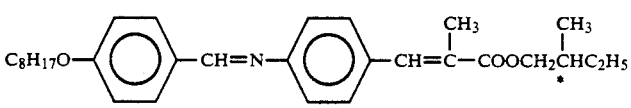
(6)

p-octyloxybenzylidene-p'-amino-2-methylbutyl-α-methylcinnamate

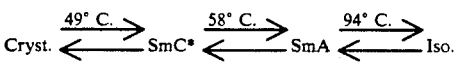

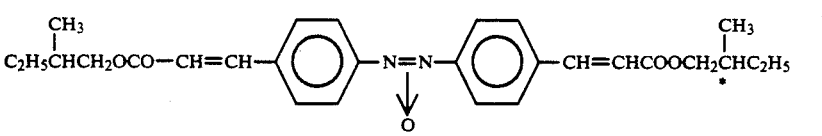
(7)

4,4'-azoxycinnamic acid-bis(2-methylbutyl)ester

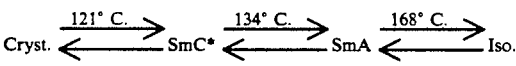

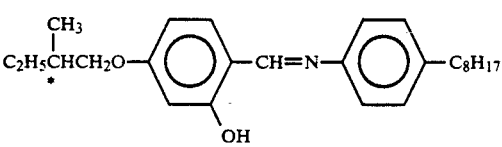
(8)

4-O-(2-methylbutyl)resorcylidene-4'-octylaniline (MBRA 8)

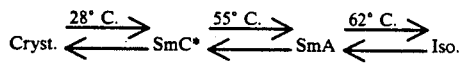
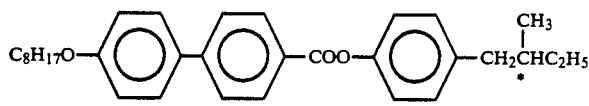
(9)
4-(2'-methylbutyl)phenyl-4'-octyloxybiphenyl-4-carboxylate
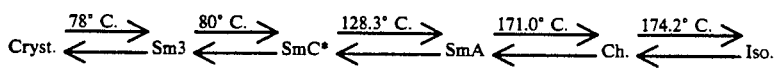
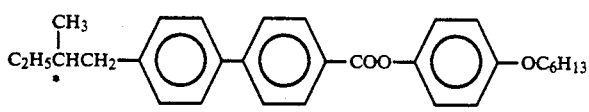
(10)
4-hexyloxyphenyl-4-(2''-methylbutyl)biphenyl-4'-carboxylate
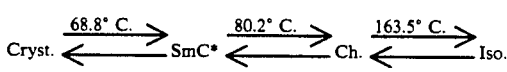
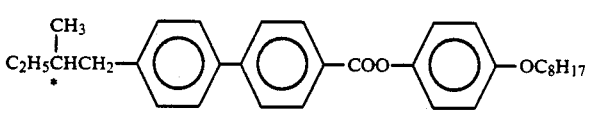
(11)
4-octyloxyphenyl-4-(2''-methylbutyl)biphenyl-4'-carboxylate
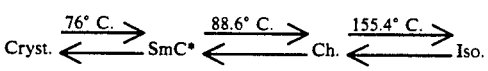
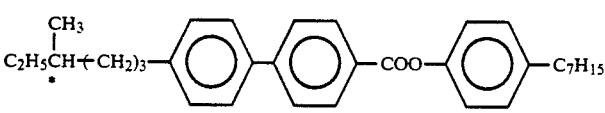
(12)
4-heptylphenyl-4-(4''-methylhexyl)biphenyl-4'-carboxylate
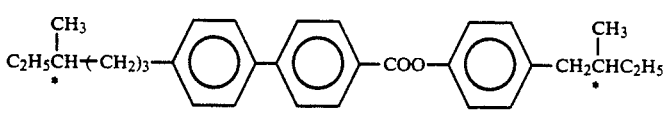
(13)
4-(2''-methylbuytyl)phenyl-4-(4''-methylhexyl)biphenyl-4'-carboxylate
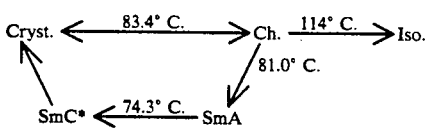
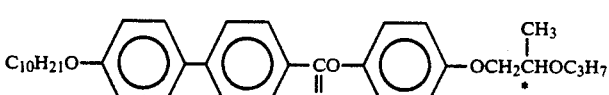
(14)
4-(2''-methylbutyl)phenyl-4-(4''-methylhexyl)biphenyl-4'-carboxylate
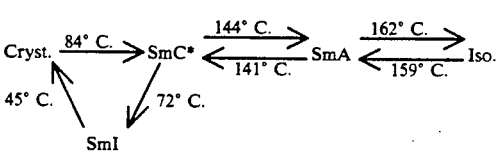

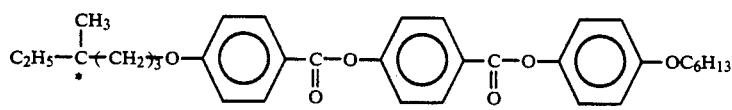

(15)

(4'-(4-hexyloxy)phenyloxycarbonyl)phenyl-p-(4''-methylhexyloxy)benzoate

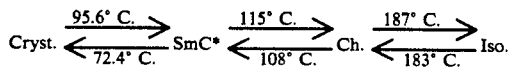

Cryst.: crystal,
SmC*: chiral smectic C phase,
SmH*: chiral smectic H phase,
SmA: smectic A phase,
SmB: smectic B phase,
Sm3: un-identified smectic phase,
Ch.: cholesteric phase,
N: nematic phase, and
Iso.: isotropic phase.

In liquid crystal compositions comprising both a polymer liquid crystal having an asymmetric carbon atom and a low molecular weight liquid crystal, it is preferred that the polymer liquid crystal is contained in a proportion of 30 wt. % or more, particularly 50 wt. % or more. Below 30 wt. %, it is difficult to effect sufficient fixation of the helical structure.

The a polymer liquid crystal or a polymer liquid crystal composition using such polymer liquid crystal may be forward in a separate film or in a layer disposed on a substrate. The polymer liquid crystal layer may have a thickness of 1-200 microns, preferably 5-100 microns.

In the case where writing or erasure is effected by using laser light etc., an improved sensitivity can be obtained by use of a laser light-absorbing layer or by adding a laser light absorbing compound to the polymer liquid crystal layer. Examples of such a laser light-absorbing compound to be added into the polymer liquid crystal layer may include those represented by the following formulae.

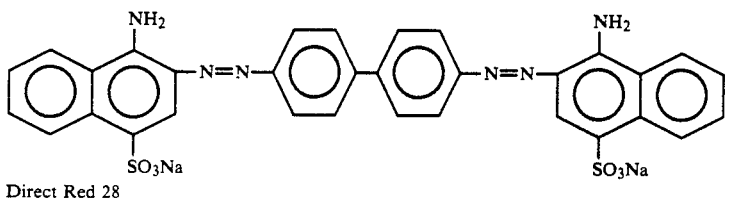
Direct Red 28

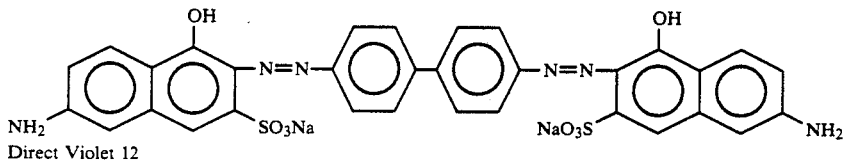
Direct Violet 12

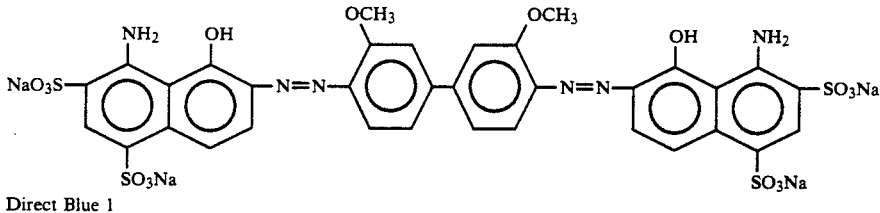
Direct Blue 1

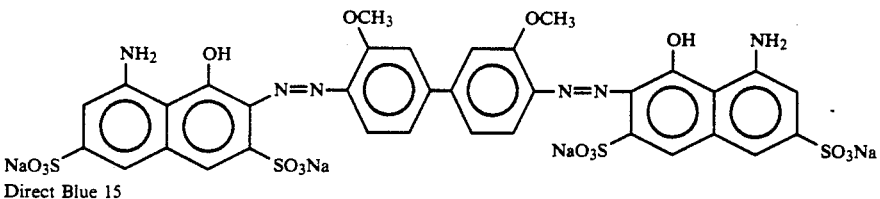
Direct Blue 15

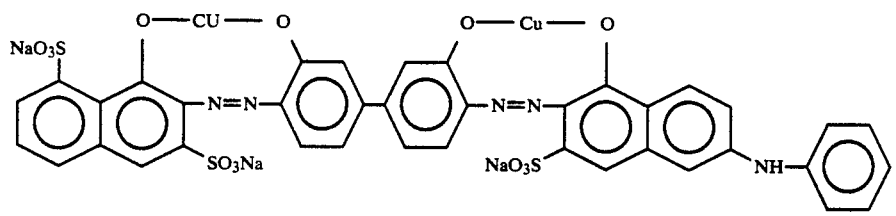
Direct Blue 98
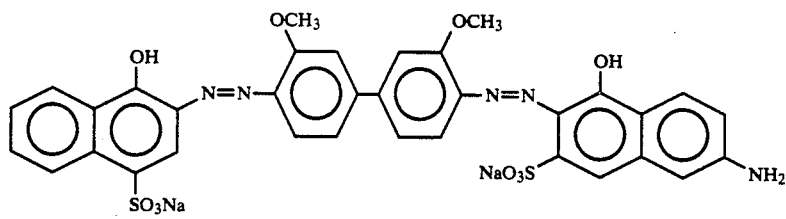
Direct Blue 151
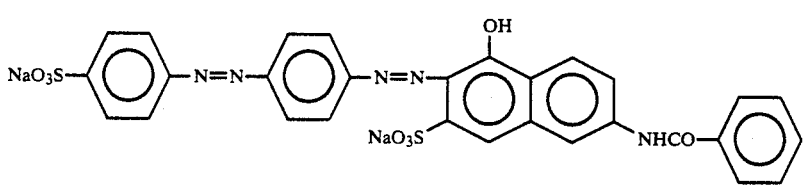
Direct Red 81
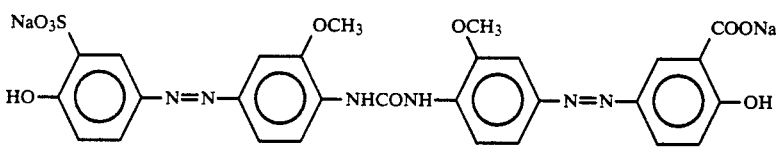
Direct Yellow 44
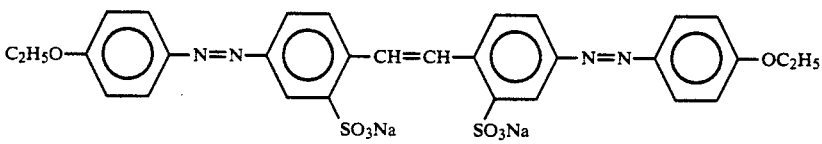
Direct Yellow 12
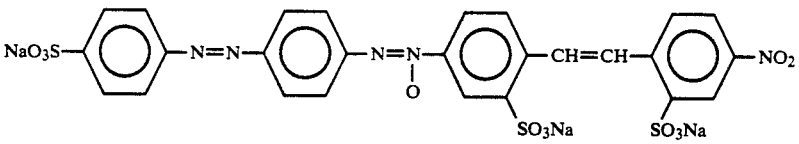
Direct Orange 39
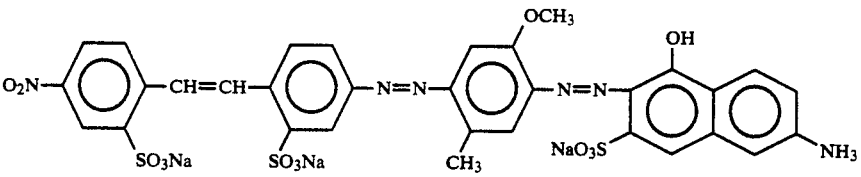
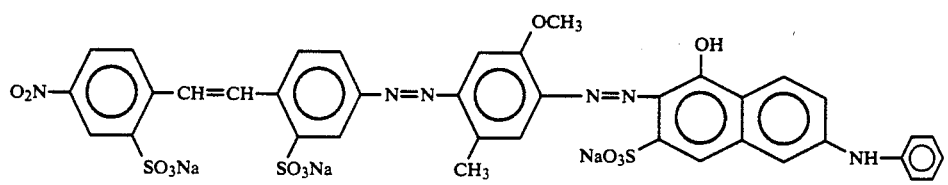

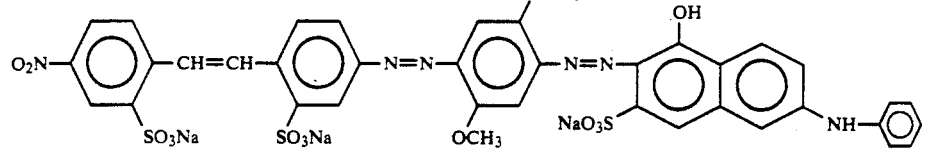
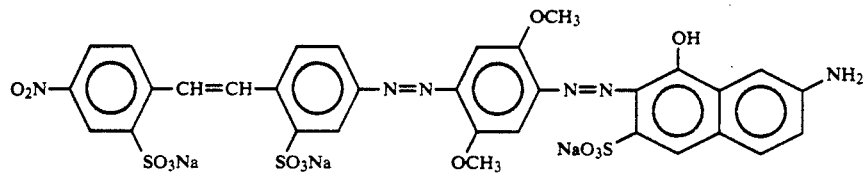
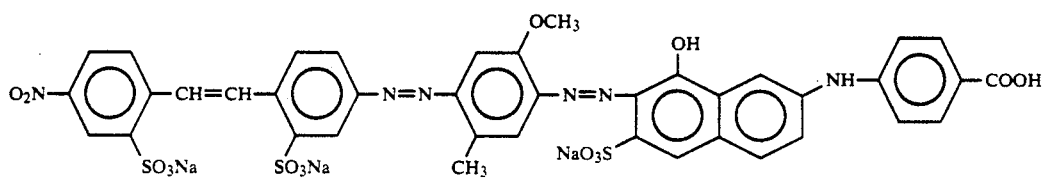
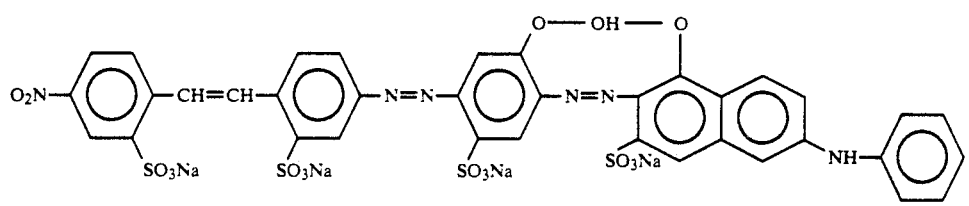
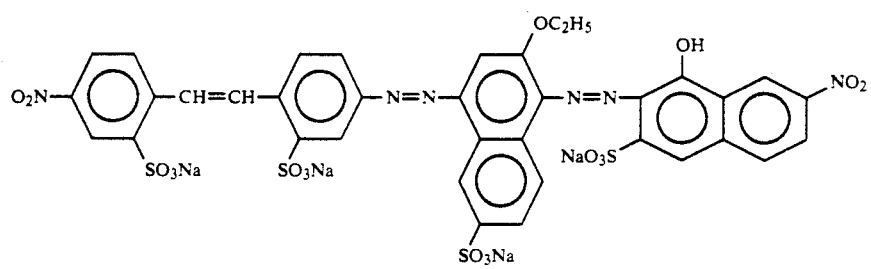
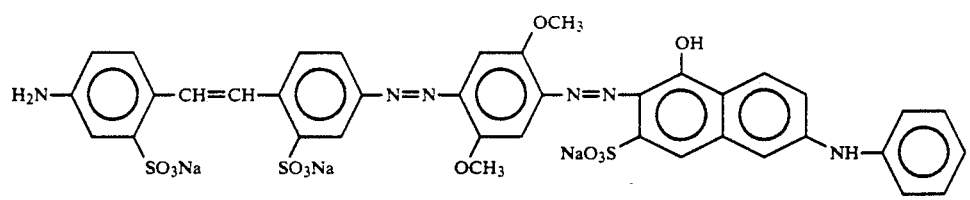
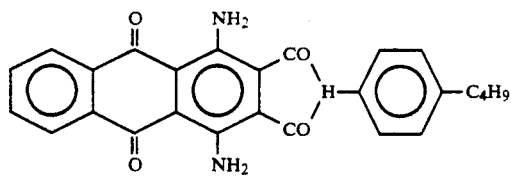
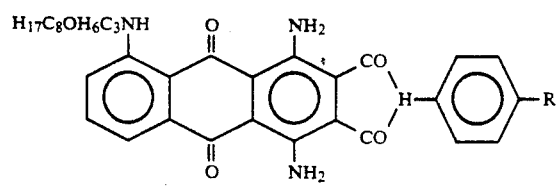

-continued
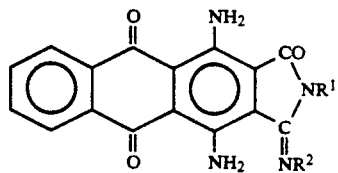
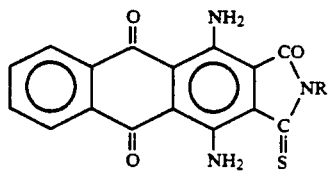
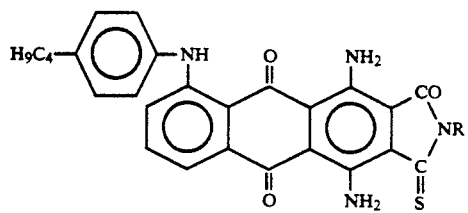
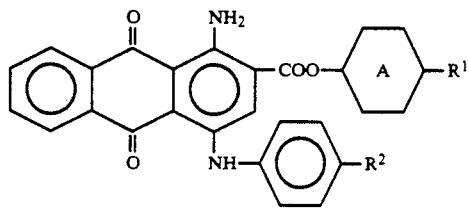
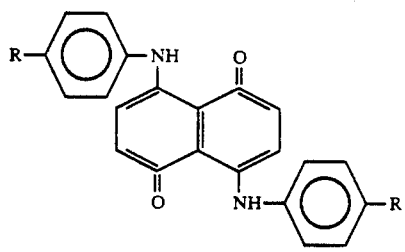
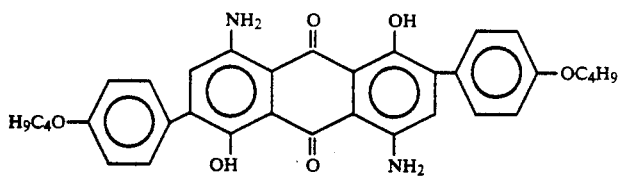
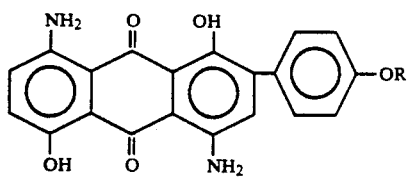
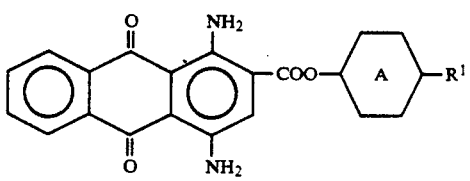

-continued
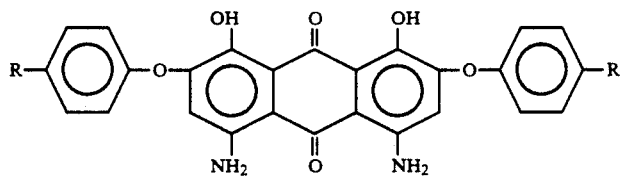
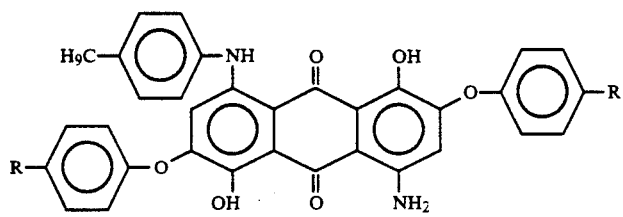
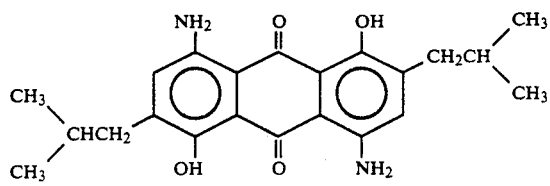
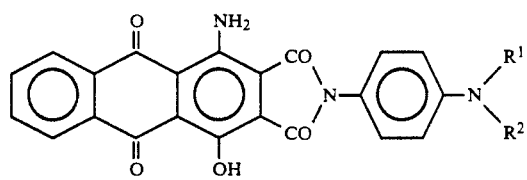
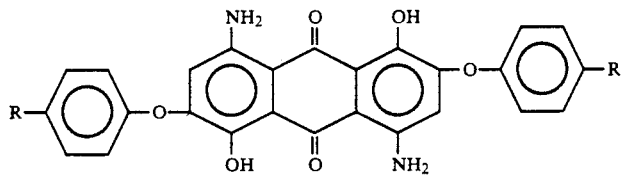
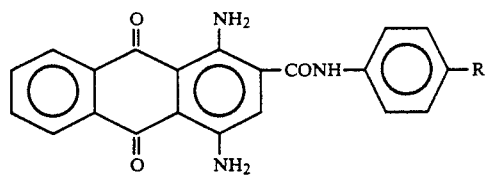
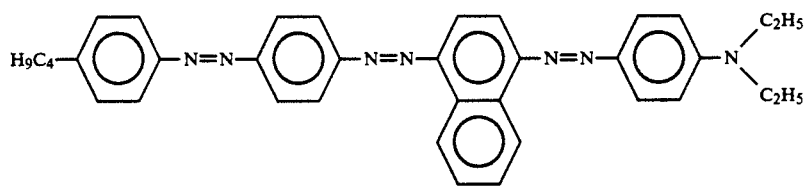
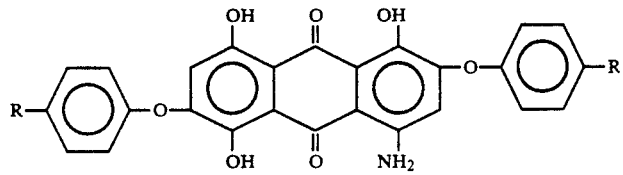

-continued
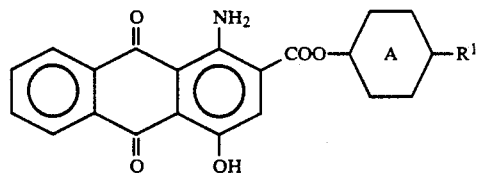
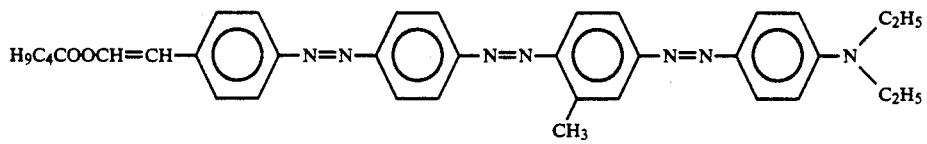
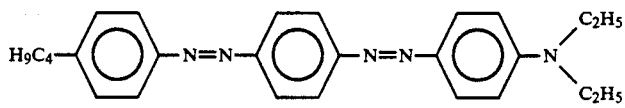
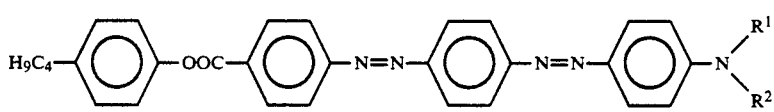
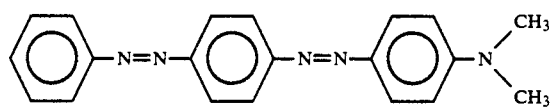
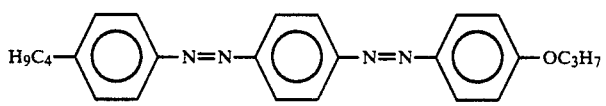
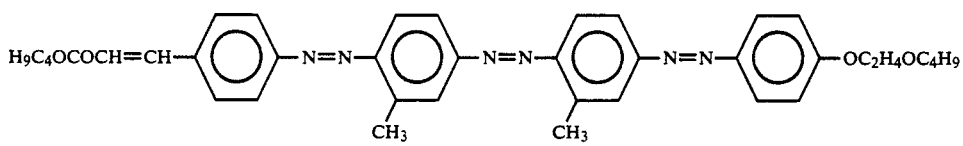
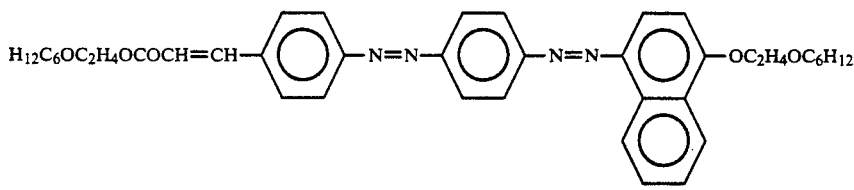
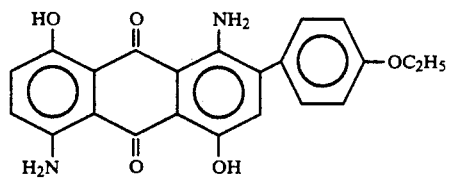
Disperse blue 214
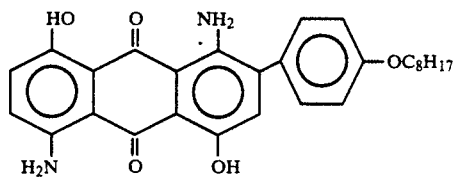

-continued
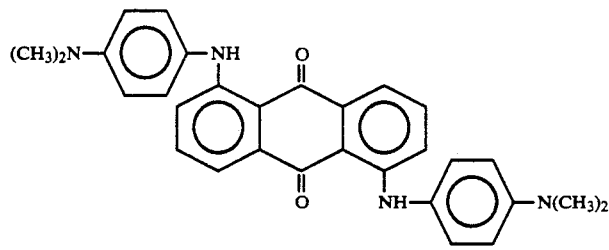
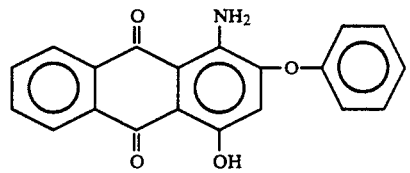
Disperse Red 60
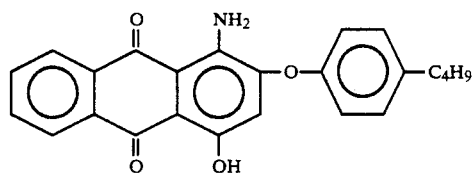
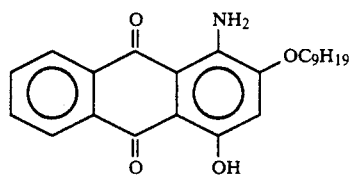
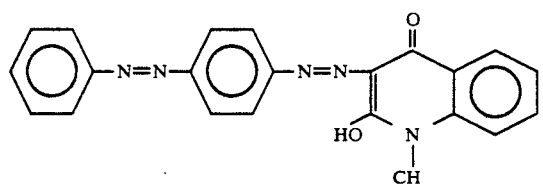
Disperse Yellow 56
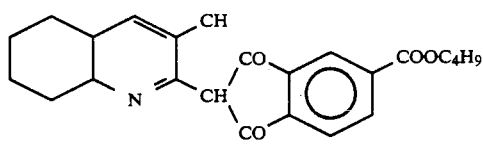
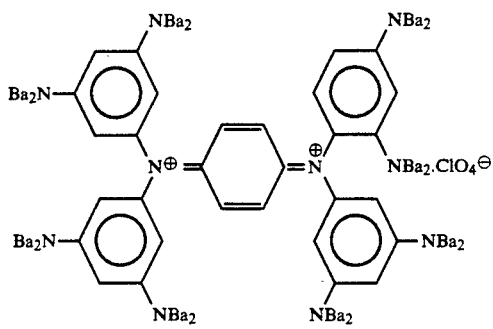

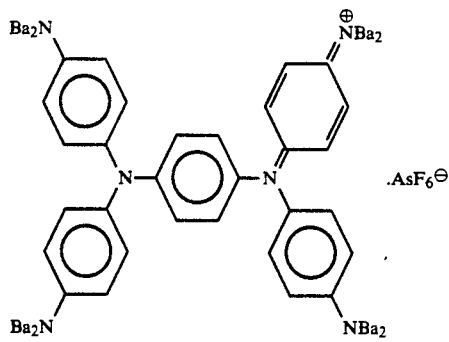

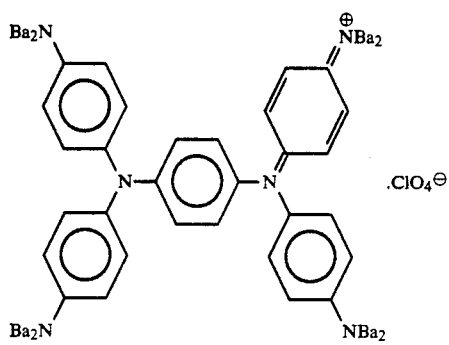

-continued

Further, it is possible to add an ultraviolet absorber, a deterioration preventing agent such as an anti-oxidant, a nucleating agent or a fluorescent dye.

It is preferred to subject a polymer liquid crystal layer thus obtained to orientation or aligning treatment, but although the recording medium of the present invention provides a high contrast without complete orientation. In order to realize a helical structure and a non-helical structure by using a response to an electric field in the chiral smectic C phase, it is particularly effective to use an alignment film.

The orientation or aligning treatment may be a homogeneous aligning treatment or a homeotropic aligning treatment. The homogeneous aligning treatment may be performed by stretching under the action of a mechanical force, roller stretching, shearing, application of an electric or magnetic field, or interfacial control. In case where a substrate is used, a homogeneous aligning treatment by interfacial control is particularly preferred.

Specific examples of the homogeneous aligning treatment by interfacial control may include the following techniques.

(1) Rubbing Method

A substrate is coated with an alignment control film by forming a film of e.g. an inorganic insulating substance, such as silicon monoxide, silicon dioxide, aluminum oxide, zirconia, magnesium fluoride, cerium oxide, cerium fluoride, silicon nitride, silicon carbide or boron nitride; or an organic insulating substance, such as polyvinyl alcohol, polyimide, polyamideimide, polyesterimide, polyparaxylylene, polyester, polycarbonate, polyvinylacetal, polyvinylchloride, polyamide, polystyrene, cellulosic resin, melamine resin, urea resin or acrylic resin, by application of a solution, vapor deposition or sputtering.

The alignment control film formed as a film of an inorganic insulating substance or organic insulating substance as described above may then be rubbed in one direction with velvet, cloth or paper on the surface thereof.

(2) Oblique Vapor Deposition

An oxide such as SiO, a fluoride, or a metal such as Au or Al or its oxide, is vapor-deposited on a substrate in a direction forming an angle inclined with respect to the substrate.

(3) Oblique Etching

An organic or inorganic insulating film as described in (1) above formed on a substrate is etched by radiation with an ion beam or oxygen plasma incident in an oblique direction.

(4) Use of a Stretched Polymer Film

A film is obtained by stretching a film of a polymer such as polyester or polyvinyl alcohol also shows a good orientation characteristic.

(5) Grating

Grooves are formed on a substrate surface by photolithography, stamping or injection.

The homeotropic aligning treatment may be performed by stretching under the action of a mechanical force, roller stretching, shearing, application of an electric field or magnetic field, or interfacial control. In the case where a substrate is used, a homeotropic aligning treatment by interfacial control is particularly preferred.

Specific examples of the homeotropic aligning treatment by interfacial control may include the following.

(1) Formation of a Homeotropic Alignment Film

A substrate surface is coated with a layer of an organic silane, lecithin or PTFE (polytetrafluoroethylene) having a homeotropic orientation characteristic.

(2) Oblique Vapor Deposition

Oblique vapor deposition is performed on a substrate while the substrate is rotated and the vapor deposition angle is appropriately selected to provide a homeotropic orientation characteristic. Further, it is also possible to apply a homeotropic aligning agent as shown in (1) above after the oblique vapor deposition.

Various orientation or aligning treatments as described above may be used singly or in combination of two or more methods.

In the present invention, a helical structure in chiral smectic C phase is used as a recorded state. As a result, when a reflected light quantity for a specific wavelength of light is measured, it has been found that the reflected light quantity continuously changes depending on the change in helical pitch. Therefore, if the polymer liquid crystal layer is held at a controlled temperature to select a helical pitch and then cooled to fix the helical pitch as a recorded state, a continuous change in reflected light quantity can be obtained and is effectively used for multi-value recording.

On the other hand, the proportion of such a helical structure can be controlled by interfacial effect or external field, and is similarly used for multi-value recording. Therefore, gradational display can be effected relatively easily.

Figure 3:
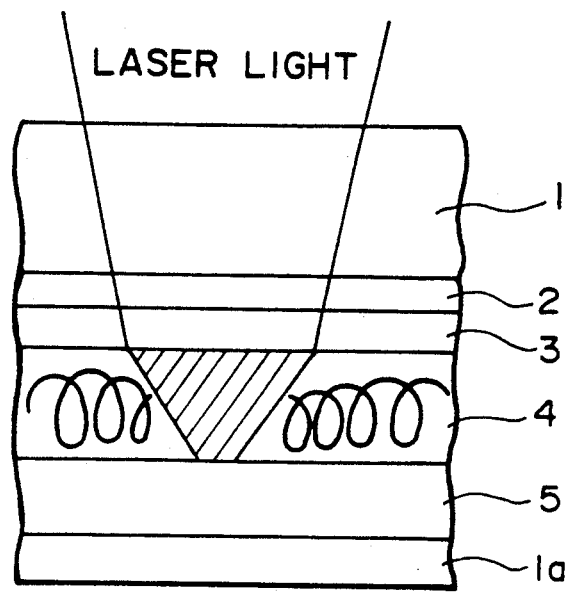
FIGS. 3 and 4 illustrate embodiment of the recording medium according to the present invention.
Figure 4:
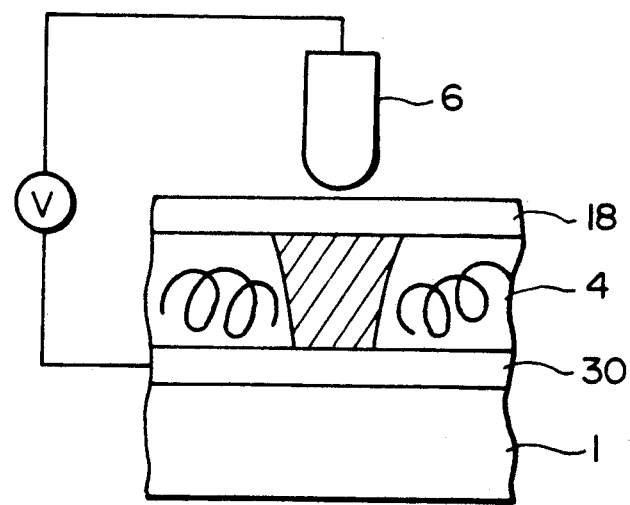

FIGS. 3 and 4 respectively illustrate the laminar structure of an embodiment of the recording medium as described above and operation thereof according to the present invention, and FIGS. 1 and 6 respectively illustrate an embodiment of the optical modulation device incorporating a recording medium according to the present invention. In these figures, like parts are denoted by the same reference numerals.

More specifically, referring to FIG. 3, a recording medium comprises in a successively laminated form a substrate 1, a transparent electrode 2, an alignment film 3, a polymer liquid crystal layer 4, a reflection layer and lower electrode 5, and a substrate 1a. A recording medium shown in FIG. 4 comprises in a successively laminated form a substrate 1, a lower electrode 30, a polymer liquid crystal layer 4 and a protective layer 18, and is used in combination with a thermal head 6 for recording.

FIG. 1 shows an optical modulation apparatus incorporating the recording medium shown in FIG. 3 and further comprising a laser source 7, a collimator lens 8, an optical modulator 9 connected to a modulation signal generator 10, a polarized beam splitter 11, a quarter wave plate 12, a condenser lens 13 connected to an actuator 14, a voltage modulator 15, a medium driver 16, and a detector 17.

Figure 5:
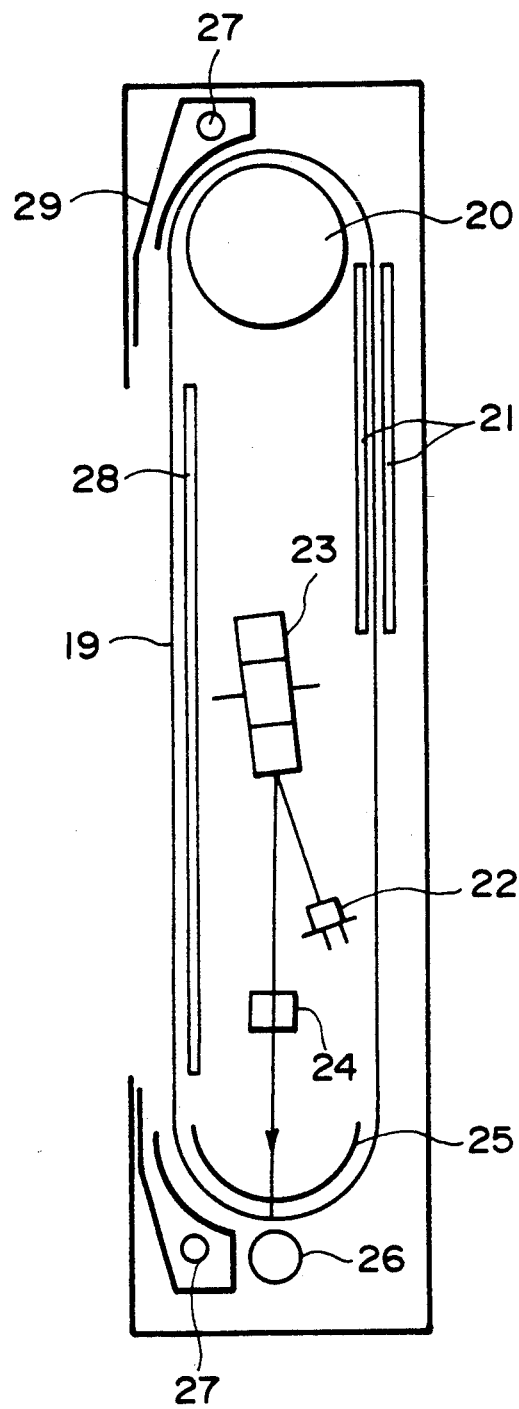
FIG. 5 is an illustration of an optical modulation apparatus of the invention.

FIG. 5 shows another optical modulation apparatus incorporating a recording medium or display medium 19 in the form of an endless belt and further comprising a drive and heating roller 20, a planar heater 21, a semiconductor laser 22, a polygonal mirror 23, an f-$\theta$ lens 24, a transparent electrode 25, a lower electrode 26, illumination light sources 27, a black body 28 and an inside face mirror 29.

Further, when a display layer comprising a polymer liquid crystal layer having a principal axis of helical structure disposed substantially perpendicularly to the display layer is used, the degree of selective scattering is enhanced to provide a display with improved contrast and color purity.

More specifically, such a display layer comprising a polymer liquid crystal having its principal axis of helical structure disposed substantially perpendicularly to the display layer is selectively heated to a prescribed temperature above the glass transition point of the polymer liquid crystal to provide a selectively varied helical pitch. The heated areas are then cooled below the glass transition point to fix the selective scattering wavelength of the polymer liquid crystal.

In order to provide a display layer comprising a polymer liquid crystal having its principal axis of helical structure disposed substantially perpendicularly to the display layer in the display medium of the present invention, it is preferred to effect an aligning treatment for the polymer liquid crystal. For example, when a polymer liquid crystal having a helical structure is used for display in its chiral smectic phase, it is preferred to effect the above-mentioned homeotropic aligning treatment. On the other hand, when a polymer liquid crystal is used in its chiral nematic phase for display, it is preferred to effect the above-mentioned homogeneous aligning treatment.

This embodiment will be explained in more detail with reference to drawings.

FIG. 6 is an illustration of such a display medium of the present invention and an embodiment of the display method using the medium. Referring to FIG. 6, a display medium comprises a substrate 31 and a light-absorbing layer 32 and an alignment control film 33 disposed successively on the substrate 31. On the alignment control film 33 is disposed a display layer 34 comprising a polymer liquid crystal compound 35 having a helical structure. The principal axis of the helical structure is disposed substantially perpendicularly to the display layer 34 and such a helical structure is structurally fixed below the glass transition point of the polymer liquid crystal. The display layer 34 is further coated with a protective layer 36.

In display operation, such a display medium having a display layer 34 comprising a polymer liquid crystal compound 35 having a helical structure with its principal axis being disposed substantially perpendicularly to the display layer 34 is subjected to selective heating with a thermal head 38 controlled by a drive pulse modulation 39 to selectively heat display layer 34 to a prescribed temperature above the glass transition point of the polymer liquid crystal 35, thereby providing a selected helical pitch. In this way, the helical pitch is selectively changed, so that a highly fine color image can be repetitively displaced and erased.

FIG. 7 is an illustration of another embodiment of the display medium and display method using the medium of the present invention. Referring to FIG. 7, the display medium comprises a substrate 31 and successively thereon an alignment control film and light absorbing layer 37, and a display layer 34 comprising a polymer liquid crystal compound 35 having a helical structure.

In displaying operation using the display medium, the display medium is irradiated with a laser light issued from a laser source 43 under the control of a laser modulator 42 and passed through a polygonal scanner 41 and an f-$\theta$ lens 40 to selectively heat the display layer 34 to a prescribed temperature above the glass transition point of the polymer liquid crystal 35 and select a pitch of the helical structure, and then cooled substantially below the glass transition point to determine a selective scattering wavelength of the polymer liquid crystal and change the helical pitch, so that a highly fine color image can be repetitively displayed and erased.

In the display medium of the present invention subjected to an aligning treatment as described in the above manner, the principal axis of helical structure of the polymer liquid crystal constituting the display layer is disposed substantially perpendicularly to the display layer, so that selective scattering can be effected very effectively. Conventionally, when a helical pitch is fixed in a glass state, a color purity has become poor because of an increase in half-width value of the selective scattering. This problem has been alleviated by the present invention. Further, a color change due to a change in view angle is also alleviated.

The wavelength causing selective scattering depends on a helical pitch and is represented by the formula of $\lambda = np$, wherein n denotes a refractive index p denotes a helical pitch and $\lambda$ denotes the wavelength of selective scattering. Color display can be effected by changing the helical pitch. In the present invention, the helical pitch may desirably be set within a range of ordinarily 250–800 nm, preferably 400–700 nm. Below 250 nm, a sufficient selective scattering efficiency is not attained, and above 800 nm, writing laser light may also be scattered.

In a change in helical pitch within the above-described range may for example be effected by temperature change, copolymerization, or electric field response and respectively can be used for color display.

The selective scattering effect obtained by the control of helical pitch in the above-described manner can be stably fixed by cooling the recording layer comprising a polymer liquid crystal to below the glass transition point. This is because the helical pitch is fixed below the glass transition point. Thus, a good image is retained as it is, so that repetitive writing is not required and the writing energy is minimized.

It is possible to provide a surface protective layer on the optical modulation medium, i.e., recording medium or display medium of the present invention. It is preferred that the protective layer is free from thermal deterioration or thermal deformation when a thermal head etc. is used for writing and erasure.

Further, it is also possible to provide a light-absorbing layer to absorb a portion of light other than selectively scattered light and improve the contrast.

In the optical modulation medium of the present invention, in order to control the temperature of the optical modulation layer comprising a polymer liquid crystal above the glass transition point for writing and erasure, laser light or a thermal head may be used. In writing, the display layer is raised to a temperature causing a change in helical structure of the polymer liquid crystal by irradiation with laser light or thermal pulse application by a thermal head and then rapidly cooled to provide an optical density different from that before the writing.

A polymer liquid crystal having a helical structure assumes chiral nematic phase or chiral smectic phase. Accordingly, it is preferred that the polymer liquid crystal has its chiral phase temperature range in the range of 0° to 300° C. Below 0° C., temperature control is difficult. Above 300° C. is not preferred because of excessive energy consumption. A further preferred chiral phase temperature range is 20° to 250° C.

Erasure may be effected by holding the optical modulation layer at a prescribed temperature above the glass transition point of the polymer liquid crystal.

Writing in the optical modulation medium comprising a polymer liquid crystal may be effected more specifically as follows.

(1) A display layer comprising a polymer liquid crystal is subjected to heat application to change the helical pitch and select a display color under temperature control. Then, the medium is cooled to hold the display color and density. Gradational display may be performed by controlling the liquid crystal proportion.

(2) Polymer liquid crystals having different helical pitches are respectively applied in the form of stripes or mosaic to form a display layer. The respective polymer liquid crystal parts are addressed and heated to prescribed temperatures by heat application means to control the display colors and densities.

(3) A display layer comprising a polymer liquid crystal is disposed between electrodes and heated above the glass transition point under application of an electric field to change the helical pitch.

By controlling the time and temperature for the heat treatment in the above-described display methods, it is possible to control not only the wavelength of selective scattering but also the quantity of scattering at a prescribed selective scattering wavelength, whereby a gradational display or full-color display can be performed.

In order to perform erasure for example by removal of the helical structure, a display layer is heated into, for example, an isotropic phase and then rapidly cooled to form a transparent state, or supplied with an electric field to form a transparent state.

Hereinafter, the present invention will be explained by way of examples.

EXAMPLE 1

A recording medium as shown in FIG. 3 was prepared in the following manner. A polyamic acid solution was applied by spin coating on a glass substrate 1 having a transparent electrode 2 and heat cured at 300° C. to form a polyimide alignment film 3. Separately, a polymer liquid crystal composition was prepared by mixing the following polymer liquid crystals (I) and (II) in a weight ratio of 2:1 and adding thereto 0.5 wt. % of a dye represented by the following formula (III).

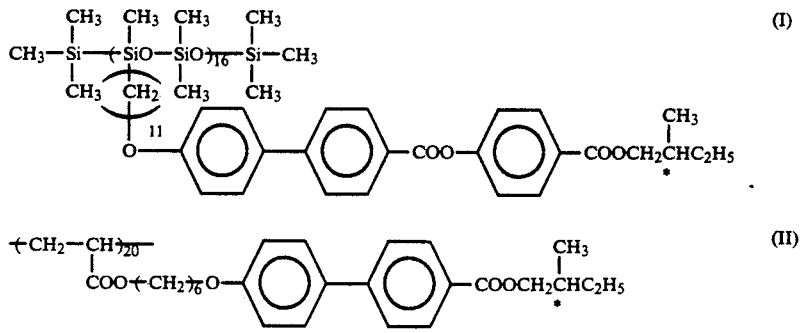

SmC*: chiral smectic phase
Ch.: cholesteric phase
Iso.: isotropic phase

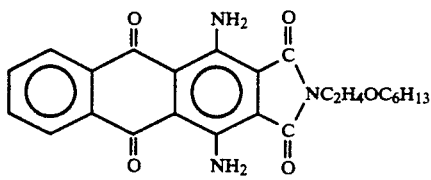

(III)

The above prepared polymer liquid crystal composition was sandwiched between the above treated glass substrate 1 and a glass substrate 1a having thereon a 5000 Å-thick reflection layer and lower electrode 5 and heat-bonded at 150° C. under vacuum. An about 50 micron-thick polymer liquid crystal layer 4 was formed in the thus prepared recording medium. Then, the medium was gradually cooled from 120° C. and observed through a reflection-type polarizing microscope, wherein a periodical helical structure was observed at 60° C. (SmC*).

EXAMPLE 2

An optical modulation system as shown in FIG. 1 was prepared by using the recording medium prepared in Example 1.

Laser light issued from a laser source 7 was modulated by an optical modulator 9 with signals from a modulation signal generator 10 and passed through a polarized light beam splitter 11 to be converted into linearly polarized light. The linearly polarized light was passed through a quarter wave plate 12 to form a circularly polarized light, which was then passed through a condenser lens 13 to be incident on the recording medium prepared in Example 1.

FIG. 3 is a enlarged view of the recording medium irradiated with the laser light. The laser power was 2 mW on the medium. The reflectance was about 20%. Then, the polarized beam splitter 11 was rotated by 90 degrees to provide a 90 degree-rotated linear polarized light, which was then similarly passed through the quarter wave plate 12 to be converted into circularly polarized light of reverse rotation. The circularly polarized light was similarly passed through the condenser lens 13 to be incident on the medium, whereby the reflectance was increased to 35%.

Then, a DC voltage of 100 V was applied to the recording medium by a voltage modulator 15 to completely remove the helical structure, whereby the reflectance was increased to 50% in about 200 msec. The laser light was stopped and again incident on the medium at a laser power of 0.5 mW, whereby no change in reflectance was observed.

EXAMPLE 3

A display apparatus as shown in FIG. 5 was prepared.

A substrate of a PET film coated with an ITO transparent electrode by sputtering was further coated by a roller coater with the polymer liquid crystal composition prepared in Example 1 heated at 120° C. The surface was further coated with a 5 micron-thick polyamide film under pressure and both ends of the laminate film thus obtained was bonded to each other to form a display medium 19 in the form of an endless film. The display medium was rotated by a drive roller 20 and held at 80° C. by a planar heater 21 to form a helical structure. The display medium was then irradiated with modulated laser light at a power of 20 mW from a semiconductor laser 22 to be sufficiently heated into an isotropic phase and then rapidly cooled to form a recorded part of a non-helical structure. During the recording, the laser light was deflected by a polygonal mirror 23 for scanning in one direction and passed through an f-$\theta$ lens 24 to be focused on the medium 19, whereby a good contrast of image was obtained.

EXAMPLE 4

A recording and reproduction system using a thermal head as shown in FIG. 4 was prepared.

A 2:1 mixture of polymer liquid crystal compounds (1) and (2) used in Example 1 was applied on a glass substrate 1 coated with an ITO transparent electrode 30 in a thickness of about 30 microns and gradually cooled from 120° C. to form a polymer liquid crystal layer. Further thereon, an ultraviolet-curable type fluorine-containing resin was applied in a thickness of 2 microns and irradiated with ultraviolet rays for curing to form a protective layer 18, thus forming a four-layer structured recording medium. The medium was caused to contact an energized thermal head 6 and a bias voltage of 200 V was applied between the lower electrode 30 and the thermal head 6. Then a recorded portion of a non helical structure was formed by cutting the current for cooling, whereby a display with a contrast of 2:1 was obtained. Further, when the medium was sandwiched between two polarizers, a display at a contrast of 10:1 was obtained and stably retained at room temperature.

EXAMPLE 5

A 0.8 mm-thick glass substrate was coated with a 500 Å-thick polyimide film by application and heat-curing. Polyimide film was subjected to a uniaxial aligning treatment and coated by dipping with a solution of a polymer liquid crystal represented by the following structural formula (IV) in dichloroethane to form a display layer.

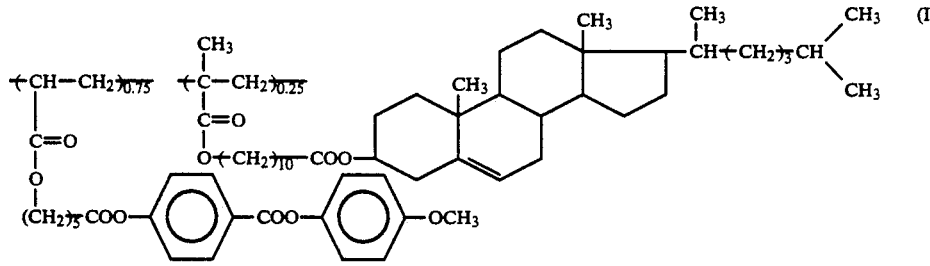

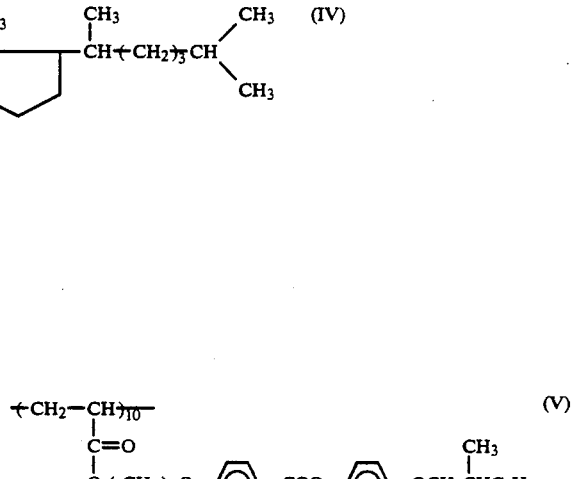

After drying, a uniaxially rubbing treated polyimide film was disposed on the display layer, and the laminate was heated into an isotropic phase, gradually cooled and held at about 130° C. for 90 min. to form a homogeneously orientation-treated cholesteric phase. The display layer thus treated was found to have a thickness of about 10 microns.

The thus prepared display medium showed a selective scattering at around 600 nm and was observed in red. The display medium was observed through a polarizing microscope and found to be uniform and non-anisotropic. The center axis of helical structure in cholesteric phase was found to be perpendicular to the display layer. Then, the display layer was caused to contact a thermal head and supplied with a heat pulse to be heated to above 200° C., whereby the heated portion became transparent to provide a good contrast, which was stably retained at room temperature for more than 1 week.

The erasure was effected by holding the medium at about 130° C. for 90 min. to form cholesteric phase again.

EXAMPLE 6

A dichloroethane solution of a polymer liquid crystal represented by the following structural formula (V) was applied by screen printing. After drying, the polymer liquid crystal layer was heated to 200° C. and gradually cooled to form a homogeneous orientation-treated uniform cholesteric phase. The display layer showed a thickness of about 50 microns. As a result of observation through a polarizing microscope, a uniform and non-anisotropic cholesteric phase was found to be formed, and the helical center axis was found to be perpendicular to the display layer.

The thus prepared display medium was irradiated with semiconductor laser light (wavelength: 830 nm), whereby the irradiated portion was written in a colorless state.

Erasure was performed by irradiating a specified part with laser light at 10 mW for 1 sec.

EXAMPLE 7

A 0.8 mm-thick glass substrate was coated with a methanol solution of a silane coupling agent (SH6040, available from Toray Silicone K.K.), which was then heat-cured to form a homeotropic alignment film. The substrate was further coated by spin coating with a dichloroethane solution of a polymer liquid crystal represented by the following structural formula (VI).

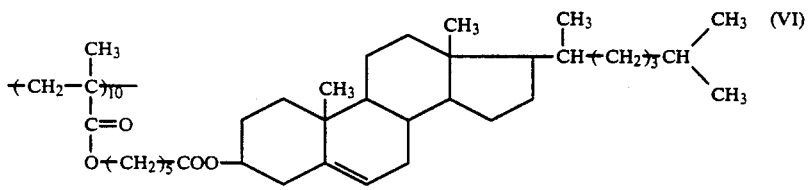

After drying, the polymer liquid crystal layer was heated to 250° C. and gradually cooled to form a homeotropically orientation-treated SmC* phase. The display layer showed a thickness of about 20 microns. As a result of observation through a polarizing microscope, the display layer was found to be uniform and non-anisotropic. A helical central axis in SmC* phase was found to be perpendicular to the display layer.

The thus prepared display medium was subjected to heat application by a thermal head, whereby a good contrast was obtained.

Erasure was performed by holding the display layer at about 180° C. for 2 sec. similarly by a thermal head. The medium was further irradiated with circularly polarized light obtained by passing laser light of 1 mW and 830 nm through a polarized beam splitter and a quarter wave plate to measure the reflected light quantity, whereby the reflectance from the portion recorded by the thermal head was 5% and the reflectance from the non-recorded portion was 40%, thus showing a high S/N ratio.

As described hereinabove, according to the present invention, there is provided a recording medium having an optical modulation layer comprising a polymer liquid crystal layer having a helical structure in chiral smectic C phase. When the recording medium is applied to an optical modulation system for controlling the helical structure and the non-helical structure, there is provided an optical modulation apparatus capable of providing images of a large area, a high degree of fineness and a high contrast and also showing large recording and erasure speeds at a low cost.

The present invention further provides a display medium having a display layer comprising a polymer liquid crystal forming a helical structure with its central axis disposed perpendicularly to the display layer. The display medium provides a highly fine color image without a display-holding operation. The display medium further provides a display showing a high selective scattering efficiency, a good contrast and a good color purity.

What is claimed is:

1. An optical modulation method, comprising the steps of:
   providing a recording medium having a polymer liquid crystal layer, said polymer liquid crystal layer exhibiting a chiral smectic C phase and having a glass transition point,
   forming a helical structure providing a helical axis extending in one direction in the chiral smectic C phase of the polymer liquid crystal layer, thereby forming a recorded state comprising selective areas in said polymer liquid crystal layer of different helical pitches of the helical structure, said different helical pitches being respectively in the range of 250–800 nm and
   maintaining the recorded state at temperature below said glass transition point of the polymer liquid crystal layer.

2. A method according to claim 1, wherein said polymer liquid crystal layer has been subjected to a homogeneous aligning treatment.

3. A device according to claim 1, wherein the helical axis extends perpendicularly to the polymer liquid crystal layer.

* * * * *

UNITED STATES PATENT AND TRADEMARK OFFICE
CERTIFICATE OF CORRECTION

PATENT NO. : 5,272,552
DATED : December 21, 1993
INVENTOR(S) : KAZUO YOSHINAGA, ET AL.

It is certified that error appears in the above-indentified patent and that said Letters Patent is hereby corrected as shown below:

COLUMN 1

Line 19, "include" should read --including--.
    Line 20, "Device" should read --Devices--.
    Line 22, "wherein," should read --wherein--.
    Line 23, "utilized" should read --utilized,--.
    Line 47, "utilize," should read --utilizes--.
    Line 49, "effect" should read --effect)--.
    Line 52, "is" should read --are--.
    Line 56, "sure" should read --since--.

COLUMN 4

Line 42, "p—5—1000." should read --p=5-1000.--.

COLUMN 5

Formula (9), "—N=N—" should read -- $-N=N-$ --.
                     O                            O Formula (13), "—N=N—" should read -- $-N=N-$ --.
                      O                            O

COLUMN 7

Line 15, "carbonatom" should read --carbon atom--.

UNITED STATES PATENT AND TRADEMARK OFFICE
CERTIFICATE OF CORRECTION

PATENT NO. : 5,272,552
DATED : December 21, 1993
INVENTOR(S) : KAZUO YOSHINAGA, ET AL.

It is certified that error appears in the above-indentified patent and that said Letters Patent is hereby corrected as shown below:

COLUMN 9

Formula (28), " 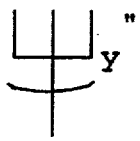 "    should read -- 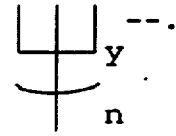 --.

COLUMN 11

Formula (29), " 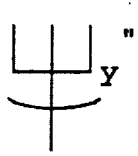 "    should read -- 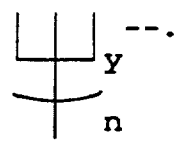 --.

Formula (33), insert: --(33)--.

COLUMN 15

Formula (42), "HO$\dashv$O" should read --H$\dashv$O--.
Formula (43), "HO$\dashv$O" should read --H$\dashv$O--.
Formula (44), "HO$\dashv$O" should read --H$\dashv$O--.

COLUMN 19

Formula (57), " 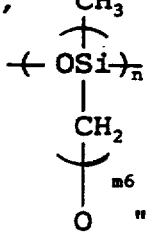 "   should read   -- 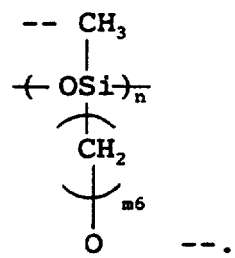 --.

Line 37, "a large degree" should read --large degrees--.

UNITED STATES PATENT AND TRADEMARK OFFICE
CERTIFICATE OF CORRECTION

PATENT NO. : 5,272,552
DATED : December 21, 1993
INVENTOR(S) : KAZUO YOSHINAGA, ET AL.

Page 3 of 4

It is certified that error appears in the above-indentified patent and that said Letters Patent is hereby corrected as shown below:

COLUMN 20

Line 41, "there" should read --their--.

Line 43, "phases)." should read --phases).
```
Cryst.:   crystal,
SmC*:     chiral smectic C phase,
SmH*:     chiral smectic H phase,
SmA:      smectic A phase,
SmB:      smectic B phase,
Sm3:      un-identified smectic phase,
Ch.:      cholesteric phase,
N:        nematic phase, and
Iso.:     isotropic phase. --.
```

COLUMN 25

Lines 10-18, delete:
```
"Cryst.:   crystal,
SmC*:     chiral smectic C phase,
SmH*:     chiral smectic H phase,
SmA:      smectic A phase,
SmB:      smectic B phase,
Sm3:      un-identified smectic phase,
Ch.:      cholesteric phase,
N:        nematic phase, and
Iso.:     isotropic phase."
```

Line 26, "a" (first occurrence) should be deleted.
Line 28, "forward" should read --formed--.

UNITED STATES PATENT AND TRADEMARK OFFICE
CERTIFICATE OF CORRECTION

PATENT NO. : 5,272,552
DATED : December 21, 1993
INVENTOR(S) : KAZUO YOSHINAGA, ET AL.

Page 4 of 4

It is certified that error appears in the above-indentified patent and that said Letters Patent is hereby corrected as shown below:

COLUMN 39

Line 35, "but" should be deleted.

COLUMN 40

Line 42, "is" should be deleted.

COLUMN 50

Line 14, "250-800 nm" should read --250-800 nm,--.
Line 21, "device" should read --method--.

Signed and Sealed this

Thirteenth Day of September, 1994

BRUCE LEHMAN

Attest:

Attesting Officer     Commissioner of Patents and Trademarks